(12) United States Patent
Wang

(10) Patent No.: US 11,227,223 B1
(45) Date of Patent: Jan. 18, 2022

(54) DISTRIBUTED CLASSIFICATION COMPUTING SYSTEM

(71) Applicant: SAS Institute Inc., Cary, NC (US)

(72) Inventor: Yingjian Wang, Apex, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 17/368,941

(22) Filed: Jul. 7, 2021

Related U.S. Application Data

(60) Provisional application No. 63/167,631, filed on Mar. 29, 2021.

(51) Int. Cl.
*G06N 5/04* (2006.01)
*G06N 20/00* (2019.01)

(52) U.S. Cl.
CPC .............. *G06N 5/04* (2013.01); *G06N 20/00* (2019.01)

(58) Field of Classification Search
None
See application file for complete search history.

(56) References Cited

U.S. PATENT DOCUMENTS 10,872,277 B1   12/2020   Wang

OTHER PUBLICATIONS

Chen, et al., VAFL: a Method of Vertical Asynchronous Federated Learning, Proceedings of the ICML Workshop on Federated Learning for User Privacy and Data Confidentiality, Jul. 2020, pp. 1-22 (Year: 2020).*
Yang, et al., Achieving Linear Speedup with Partial Worker Participation in Non-IID Federated Learning, ICLR 2021, 2021, pp. 1-23 (Year: 2021).*
Ballard, G., Demmel, J., Holtz, O., And Schwartz, O. Communication-optimal parallel and sequential Cholesky decomposition. SIAM Journal on Scientific Computing 32, 6 (2010), 3495-3523.
Carl Eduard Rasmussen and Christopher K.I. Williams, "Gaussian Processes for Machine Learning", MIT Press 2006, Chapter 3.

* cited by examiner

*Primary Examiner* — Wilbert L Starks
(74) *Attorney, Agent, or Firm* — Bell & Manning, LLC

(57) ABSTRACT

A computing system trains a classification model using distributed training data. In response to receipt of a first request, a training data subset is accessed and sent to each higher index worker computing device, the training data subset sent by each lower index worker computing device is received, and a first kernel matrix block and a second kernel matrix block are computed using a kernel function and the accessed or received training data subsets. (A) In response to receipt of a second request from the controller device, a first vector is computed using the first and second kernel matrix blocks, a latent function vector and an objective function value are computed, and the objective function value is sent to the controller device. (A) is repeated until the controller device determines training of a classification model is complete. Model parameters for the trained classification model are output.

30 Claims, 25 Drawing Sheets
(6 of 25 Drawing Sheet(s) Filed in Color)

DISTRIBUTED CLASSIFICATION COMPUTING SYSTEM

CROSS-REFERENCE TO RELATED APPLICATIONS

The present application claims the benefit of and priority to 35 U.S.C. § 119(e) to U.S. Provisional Patent Application No. 63/167,631 filed Mar. 29, 2021, the entire contents of which are hereby incorporated by reference.

BACKGROUND

Gaussian process classification has been applied to classification tasks and includes parameters that are adaptive to the data to which the classification is applied and for which a Gaussian process model is defined. A classic inference method for Gaussian process classification, called the Laplacian approximation has been shown to yield very good classification results. However, Gaussian process classification with Laplacian approximation is unworkable with relatively large datasets, e.g., datasets with more than a million of observations, due to the prohibitive amount of computing time incurred.

SUMMARY

In an example embodiment, a computer-readable medium is provided having stored thereon computer-readable instructions that when executed by each computing device of a plurality of worker computing devices cause each computing device to train a classification model using distributed data. A unique worker index is received from a controller device. The unique worker index is sequentially assigned to each worker computing device of the plurality of worker computing devices by the controller device. A higher index worker has a higher value for the sequentially assigned, unique worker index. A lower index worker has a lower value for the sequentially assigned, unique worker index.

In response to receipt of a first computation request from the controller device, a training data subset distributed to a respective computing device is accessed; the accessed training data subset is sent to each higher index worker computing device; the training data subset sent by each lower index worker computing device is received; a first kernel matrix block is computed for the accessed training data subset using a predefined kernel function, and a second kernel matrix block is computed for each received training data subset using the predefined kernel function. The training data subset is a subset of a training dataset. The first kernel matrix block is computed between observation vectors included in the accessed training data subset. Each second kernel matrix block is computed between observation vectors included in the accessed training data subset and each respective, received training data subset.

(A) in response to receipt of a second computation request from the controller device, a first vector is computed using the computed first kernel matrix block and each computed second kernel matrix block; a latent function vector is computed using the computed first kernel matrix block and the computed first vector; an objective function value is computed using the computed first vector, the computed latent function vector, and a likelihood function value computed for each observation vector included in the accessed training data subset; and the computed objective function value is sent to the controller device. (A) is repeated until the controller device determines training of a classification model is complete. Model parameters for the trained classification model are output. The model parameters are computed from the likelihood function value computed for each observation vector included in the accessed training data subset, the computed first kernel matrix block, and each computed second kernel matrix block.

In another example embodiment, a system is provided. The system includes, but is not limited to, a plurality of worker computing devices. Each computing device of the plurality of worker computing devices includes, but is not limited to, a processor and a non-transitory computer-readable medium having stored thereon computer-readable instructions that when executed by each computing device cause each computing device to train a classification model using distributed data.

In yet another example embodiment, a method of training a classification model using distributed training data is provided.

Other principal features of the disclosed subject matter will become apparent to those skilled in the art upon review of the following drawings, the detailed description, and the appended claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Illustrative embodiments of the disclosed subject matter will hereafter be described referring to the accompanying drawings, wherein like numerals denote like elements.

DETAILED DESCRIPTION

Classification is a recognition, differentiation, and organization of observed observation data into categories or classes to which labels may be assigned that identify a characteristic of each observation. The most common classification is a binary classification, where the data are labeled between two classes such as '0' or '1'. Classification is a supervised learning task that uses training data that has been labeled to train a classification model that can be applied to classify unclassified or unlabeled data.

Gaussian process classification (GPC) implements Gaussian processes (GP) for classification purposes, more specifically for probabilistic classification in a nonparametric way, where test predictions take the form of class probabilities. GPC places a GP prior on a latent function, which is passed through a sigmoid function to obtain the probabilistic classification. The latent function may be a so-called nuisance function whose values are not observed and are not relevant by themselves. The purpose of the latent function is to provide a convenient formulation of the classification model, and the latent function is integrated out during the process of predicting a class.

In contrast to a regression setting, the posterior of the latent function vector in GPC is not Gaussian even for a GP prior since a Gaussian likelihood is inappropriate for discrete class labels. Rather, a non-Gaussian likelihood corresponding to the logistic link function (logit) may be used as well as other optional functions.

There are two major methods for model inference for GPC, the Laplacian approximation (LA) and stochastic variational inference (SVI). The LA method uses a Gaussian to approximate the usually not Gaussian model posterior. LA can also be regarded as a variational inference method that has the advantage of accurate classification results with the disadvantage of being computationally slow and, as a result, inapplicable to large datasets. SVI uses a stochastic search in the model inference process and a variational posterior on a number of randomly selected minibatches of training data. SVI is computationally fast, but less accurate including sometimes yielding poor classification results.

A classification model training application 222 described herein provides a distributed LA inference method for GPC so that the more accurate LA inference method for GPC can be applied to large datasets distributed across a plurality of computing devices. Existing LA inference methods for GPC cannot be applied to large, distributed data. Classification model training application 222 provides no loss in classification accuracy with a significantly faster computation time using a distributed computer processing system for training and applying the classification model.

Figure 1:
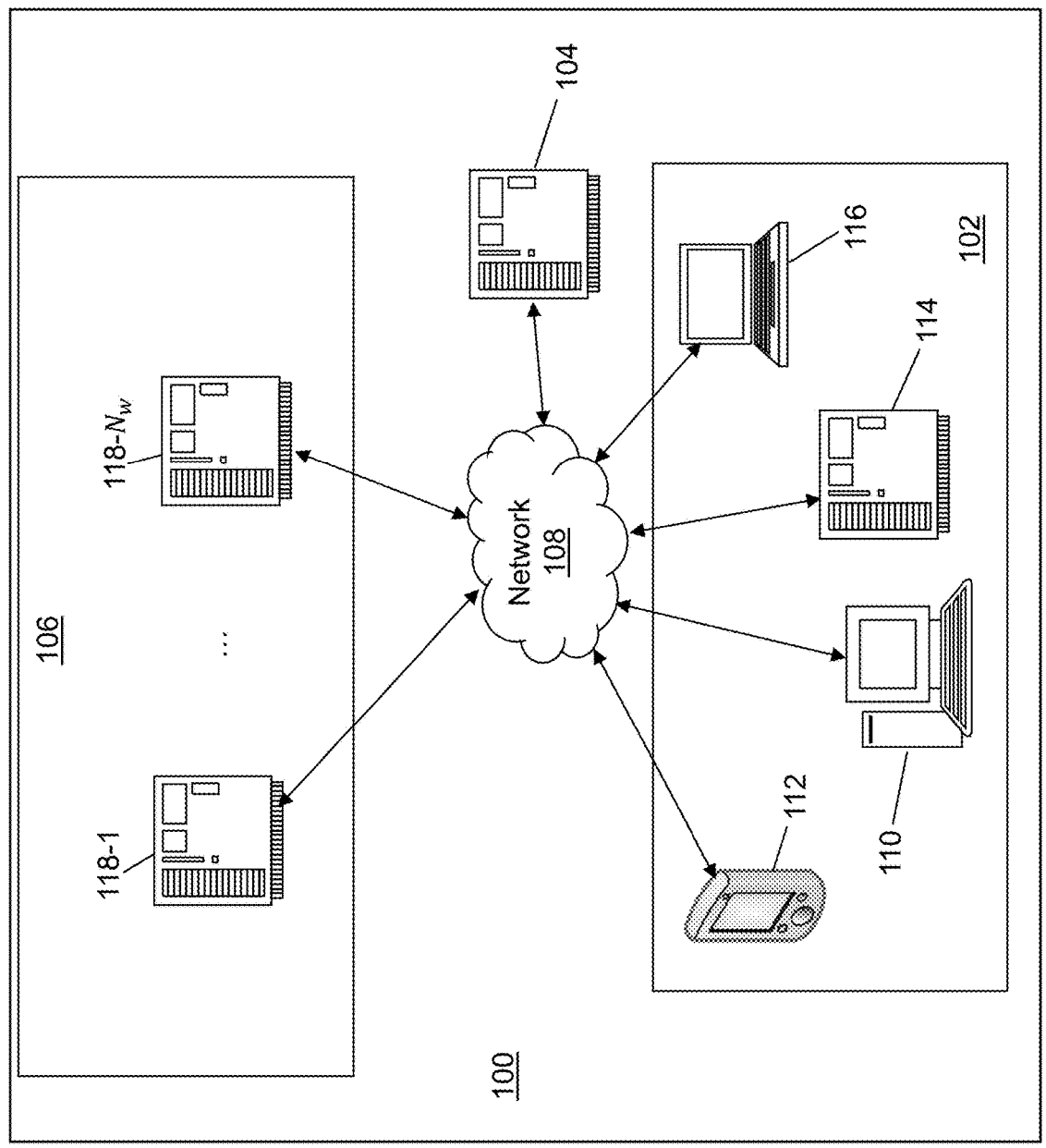
FIG. 1 depicts a block diagram of a classification model training system in accordance with an illustrative embodiment.

Referring to FIG. 1, a block diagram of a classification model training system 100 is shown in accordance with an illustrative embodiment. In an illustrative embodiment, classification model training system 100 may include a user system 102, a controller device 104, a worker system 106, and a network 108. Each of user system 102, controller device 104, and worker system 106 may be composed of one or more discrete computing devices in communication through network 108. User system 102 and controller device 104 may be integrated into a single computing device.

Network 108 may include one or more networks of the same or different types. Network 108 can be any type of wired and/or wireless public or private network including a cellular network, a local area network, a wide area network such as the Internet or the World Wide Web, etc. Network 108 further may comprise sub-networks and consist of any number of communication devices.

The one or more computing devices of user system 102 may include computing devices of any form factor such as a desktop 110, a smart phone 112, a server computer 114, a laptop 116, a personal digital assistant, an integrated messaging device, a tablet computer, etc. User system 102 can include any number and any combination of form factors of computing devices that may be organized into subnets. In general, a "server" computer may include faster processors, additional processors, more disk memory, and/or more random access memory (RAM) than another computer form factor and support multi-threading as understood by a person of skill in the art. The computing devices of user system 102 may send and receive signals through network 108 to/from another of the one or more computing devices of user system 102 and/or to/from controller device 104. The one or more computing devices of user system 102 may communicate using various transmission media that may be wired and/or wireless as understood by those skilled in the art. The one or more computing devices of user system 102 may be geographically dispersed from each other and/or co-located.

Figure 2:
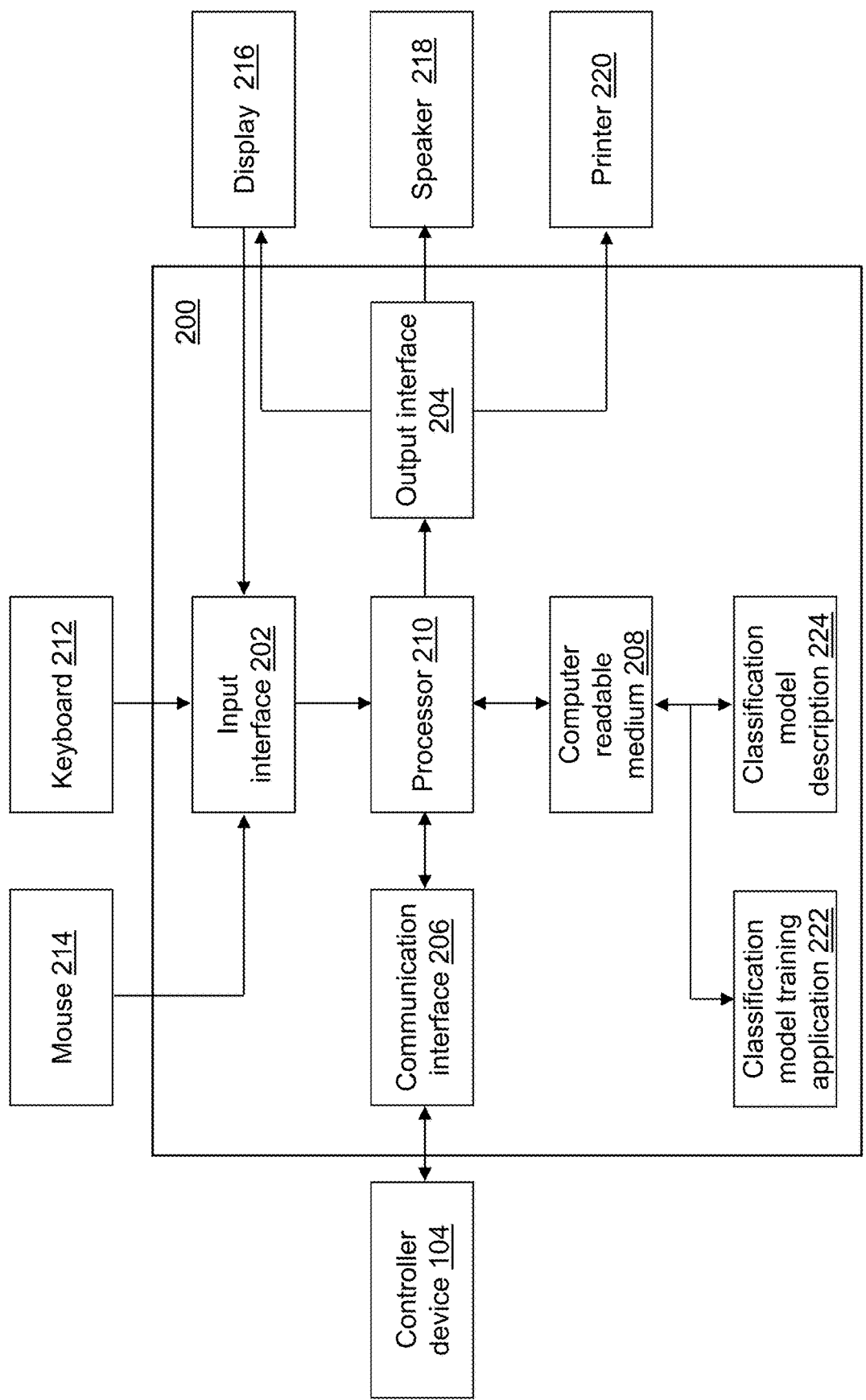
FIG. 2 depicts a block diagram of a user device of the classification model training system of FIG. 1 in accordance with an illustrative embodiment.

For illustration, referring to FIG. 2, a block diagram of a user device 200 is shown in accordance with an example embodiment. User device 200 is an example computing device of user system 102. For example, each of desktop 110, smart phone 112, server computer 114, and laptop 116 may be an instance of user device 200. User device 200 may include an input interface 202, an output interface 204, a communication interface 206, a non-transitory computer-readable medium 208, a processor 210, classification model training application 222, and a classification model description 224. Each computing device of user system 102 may be executing classification model training application 222 of the same or different type. User device 200 may execute classification model training application 222 that triggers creation of classification model description 224.

Referring again to FIG. 1, controller device 104 can include any form factor of computing device. For illustration, FIG. 1 represents controller device 104 as a server computer. Controller device 104 may send and receive signals through network 108 to/from user system 102 and/or to/from worker system 106. Controller device 104 may communicate using various transmission media that may be wired and/or wireless as understood by those skilled in the art. Controller device 104 may be implemented on a plurality of computing devices of the same or different type. Classification model training system 100 further may include a plurality of controller devices.

Figure 3:
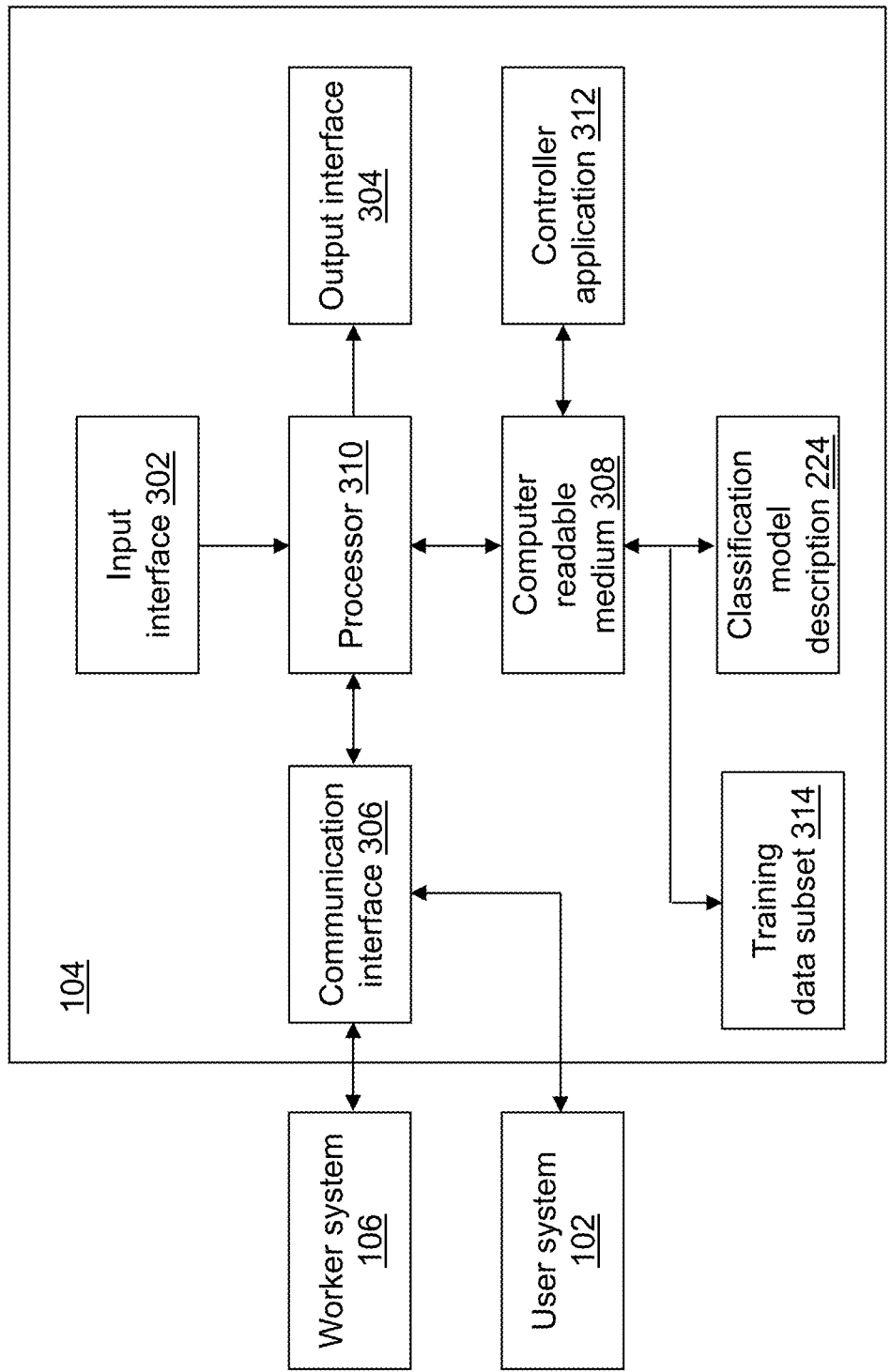
FIG. 3 depicts a block diagram of a controller device of the classification model training system of FIG. 1 in accordance with an illustrative embodiment.

For illustration, referring to FIG. 3, a block diagram of controller device 104 is shown in accordance with an illustrative embodiment. Controller device 104 may include a second input interface 302, a second output interface 304, a second communication interface 306, a second non-transitory computer-readable medium 308, a second processor 310, a controller application 312, training data subset 314, and classification model description 224. Controller device 104 may execute controller application 312 that creates classification model description 224 that may be shared with or accessible by user device 200.

Referring again to FIG. 1, the one or more computing devices of worker system 106 may include computers of any form factor such as a desktop, a server, a laptop, etc. For example, in the illustrative embodiment, worker system 106 includes a first worker computer 118-1, . . . , and an $N_w^{th}$ worker computer 118-$N_w$, where $N_w$ indicates a number of worker computing devices of worker system 106. Each worker computer may support use of a plurality of threads. The computing devices of worker system 106 may send and receive signals through network 108 to/from controller device 104 and/or to/from another computing device of worker system 106. The one or more computing devices of worker system 106 may be geographically dispersed from each other and/or co-located. The one or more computing devices of worker system 106 may communicate using various transmission media that may be wired and/or wireless as understood by those skilled in the art.

Figure 4:
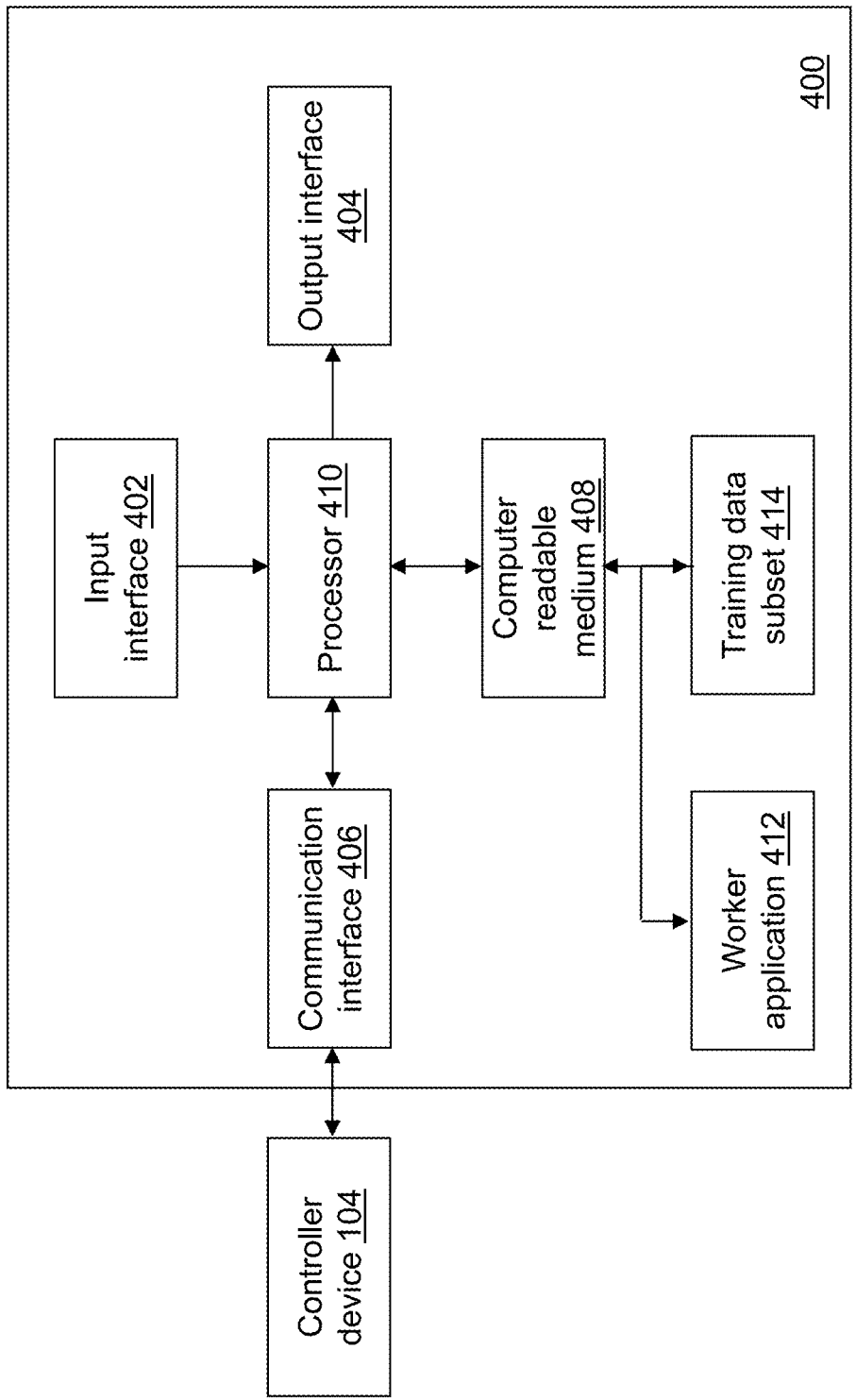
FIG. 4 depicts a block diagram of a worker device of the classification model training system of FIG. 1 in accordance with an illustrative embodiment.

For illustration, referring to FIG. 4, a block diagram of a worker device 400 is shown in accordance with an example embodiment. Worker device 400 is an example computing device of worker system 106. For example, each of first worker computer 118-1, . . . , and $N_w^{th}$ worker computer 118-$N_w$ may be an instance of worker device 400. Worker device 400 may include a third input interface 402, a third output interface 404, a third communication interface 406, a third non-transitory computer-readable medium 408, a third processor 410, a worker application 412, and a training data subset 414. A training dataset is distributed into training data subset 414 distributed across each worker device 400 of worker system 106 such that a unique portion of the training dataset is distributed onto each of the $N_w$ worker computing devices of worker system 106 and the entirety of the training dataset is distributed. In an alternative embodiment, controller device 104 may also be used to perform the operations described for each worker device 400 with a portion of the training dataset distributed to controller device 104 and stored in training data subset 314. To make a number of observation vectors distributed onto each worker device 400 equal, one or more rows of observation vectors having zero values for all of the variables may be appended to training data subset 414 on a single worker device 400 of worker system 106 or to training data subset 314 of controller device 104.

Referring again to FIG. 2, each user device 200 of user system 102 may include the same or different components and combinations of components. Fewer, different, and additional components may be incorporated into user device 200.

Input interface 202 provides an interface for receiving information from the user or another device for entry into user device 200 as understood by those skilled in the art. Input interface 202 may interface with various input technologies including, but not limited to, a keyboard 212, a microphone, a mouse 214, a display 216, a track ball, a keypad, one or more buttons, etc. to allow the user to enter information into user device 200 or to make selections presented in a user interface displayed on display 216.

The same interface may support both input interface 202 and output interface 204. For example, display 216 comprising a touch screen provides a mechanism for user input and for presentation of output to the user. User device 200 may have one or more input interfaces that use the same or a different input interface technology. The input interface technology further may be accessible by user device 200 through communication interface 206.

Output interface 204 provides an interface for outputting information for review by a user of user device 200 and/or for use by another application or device. For example, output interface 204 may interface with various output technologies including, but not limited to, display 216, a speaker 218, a printer 220, etc. User device 200 may have one or more output interfaces that use the same or a different output interface technology. The output interface technology further may be accessible by user device 200 through communication interface 206.

Communication interface 206 provides an interface for receiving and transmitting data between devices using various protocols, transmission technologies, and media as understood by those skilled in the art. Communication interface 206 may support communication using various transmission media that may be wired and/or wireless. User device 200 may have one or more communication interfaces that use the same or a different communication interface technology. For example, user device 200 may support communication using an Ethernet port, a Bluetooth® antenna, a telephone jack, a USB port, etc. Data and/or messages may be transferred between user device 200 and controller device 104 using communication interface 206.

Computer-readable medium 208 is an electronic holding place or storage for information so the information can be accessed by processor 210 as understood by those skilled in the art. Computer-readable medium 208 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. User device 200 may have one or more computer-readable media that use the same or a different memory media technology. For example, computer-readable medium 208 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. User device 200 also may have one or more drives that support the loading of a memory media such as a CD, DVD, an external hard drive, etc. One or more external hard drives further may be connected to user device 200 using communication interface 206.

Processor 210 executes instructions as understood by those skilled in the art. The instructions may be carried out by a special purpose computer, logic circuits, or hardware circuits. Processor 210 may be implemented in hardware and/or firmware. Processor 210 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 210 operably couples with input interface 202, with output interface 204, with communication interface 206, and with computer-readable medium 208 to receive, to send, and to process information. Processor 210 may retrieve a set of instructions from a permanent memory device and copy the instructions in an executable form to a temporary memory device that is generally some form of RAM. User device 200 may include a plurality of processors that use the same or a different processing technology.

Some machine-learning approaches may be more efficiently and speedily executed and processed with machine-learning specific processors (e.g., not a generic central processing unit (CPU)). Such processors may also provide additional energy savings when compared to generic CPUs. For example, some of these processors can include a graphical processing unit, an application-specific integrated circuit, a field-programmable gate array, an artificial intelligence accelerator, a purpose-built chip architecture for machine learning, and/or some other machine-learning specific processor that implements a machine learning approach using semiconductor (e.g., silicon, gallium arsenide) devices. These processors may also be employed in heterogeneous computing architectures with a number of and a variety of different types of cores, engines, nodes, and/or layers to achieve additional various energy efficiencies, processing speed improvements, data communication speed improvements, and/or data efficiency targets and improvements throughout various parts of the system.

Classification model training application 222 performs operations associated with triggering training of a classification model using data stored in the training dataset. Information that describes the trained classification model is stored in classification model description 224. Data describing the trained classification model may be read from classification model description 224 and used to predict classifications for data stored in input data that may be distributed across a second worker system 806 (shown referring to FIG. 8). Some or all of the operations described herein may be embodied in classification model training application 222. The operations may be implemented using hardware, firmware, software, or any combination of these methods.

Referring to the example embodiment of FIG. 2, classification model training application 222 is implemented in software (comprised of computer-readable and/or computer-executable instructions) stored in computer-readable medium 208 and accessible by processor 210 for execution of the instructions that embody the operations of classification model training application 222. Classification model training application 222 may be written using one or more programming languages, assembly languages, scripting languages, etc. Classification model training application 222 may be integrated with other analytic tools. As an example, classification model training application 222 may be part of an integrated data analytics software application and/or software architecture such as that offered by SAS Institute Inc. of Cary, N.C., USA. Merely for illustration, classification model training application 222 may be implemented using or integrated with one or more SAS software tools such as JMP®, Base SAS, SAS® Enterprise Miner™, SAS® Event Stream Processing, SAS/STAT®, SAS® High Performance Analytics Server, SAS® Visual Data Mining and Machine Learning, SAS® LASR™, SAS® In-Database Products, SAS® Scalable Performance Data Engine, SAS® Cloud Analytic Services (CAS), SAS/OR®, SAS/ETS®, SAS® Visual Analytics, SAS® Viya™, and SAS In-Memory Statistics for Hadoop®, etc. all of which are developed and provided by SAS Institute Inc. of Cary, N.C., USA. Data mining, statistical analytics, and response prediction are practically applied in a wide variety of industries to solve technical problems.

Classification model training application 222 may be implemented as a Web application. For example, classification model training application 222 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java® applet, an extensible markup language (XML) file, or any other type of file supported by HTTP.

Referring to FIG. 3, fewer, different, or additional components may be incorporated into controller device 104. Second input interface 302 provides the same or similar functionality as that described with reference to input interface 202 of user device 200 though referring to controller device 104. Second output interface 304 provides the same or similar functionality as that described with reference to output interface 204 of user device 200 though referring to controller device 104. Second communication interface 306 provides the same or similar functionality as that described with reference to communication interface 206 of user device 200 though referring to controller device 104. Data and messages may be transferred between controller device 104 and user device 200 using second communication interface 306. Second computer-readable medium 308 provides the same or similar functionality as that described with reference to computer-readable medium 208 of user device 200 though referring to controller device 104. Second processor 310 provides the same or similar functionality as that described with reference to processor 210 of user device 200 though referring to controller device 104.

Controller application 312 performs operations associated with training a classification model based on inputs provided from user device 200 and using the computing devices of worker system 106. The operations may be implemented using hardware, firmware, software, or any combination of these methods. Referring to the example embodiment of FIG. 3, controller application 312 is implemented in software (comprised of computer-readable and/or computer-executable instructions) stored in second computer-readable medium 308 and accessible by second processor 310 for execution of the instructions that embody the operations of controller application 312. Controller application 312 may be written using one or more programming languages, assembly languages, scripting languages, etc. Controller application 312 may be implemented as a Web application.

Controller application 312 may be integrated with other analytic tools. As an example, controller application 312 may be part of an integrated data analytics software application and/or software architecture such as that offered by SAS Institute Inc. of Cary, N.C., USA. For example, controller application 312 may be part of SAS® CAS developed and provided by SAS Institute Inc. of Cary, N.C., USA. Merely for further illustration, controller application 312 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Visual Data Mining and Machine Learning, SAS® Visual Analytics, SAS® Viya™, and SAS In-Memory Statistics for Hadoop®.

Referring to FIG. 4, fewer, different, and additional components may be incorporated into worker device 400. Each worker device 400 of worker system 106 may include the same or different components or combination of components. Third input interface 402 provides the same or similar functionality as that described with reference to input interface 202 of user device 200 though referring to worker device 400. Third output interface 404 provides the same or similar functionality as that described with reference to output interface 204 of user device 200 though referring to worker device 400. Third communication interface 406 provides the same or similar functionality as that described with reference to communication interface 206 of user device 200 though referring to worker device 400. Data and messages may be transferred between controller device 104 and worker device 400 using third communication interface 406. Third computer-readable medium 408 provides the same or similar functionality as that described with reference to computer-readable medium 208 of user device 200 though referring to worker device 400. Third processor 410 provides the same or similar functionality as that described with reference to processor 210 of user device 200 though referring to worker device 400.

Worker application 412 may be integrated with other analytic tools. As an example, worker application 412 may be part of an integrated data analytics software application and/or software architecture such as that offered by SAS Institute Inc. of Cary, N.C., USA. For example, worker application 412 may be part of SAS® CAS. Merely for further illustration, worker application 412 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Visual Data Mining and Machine Learning, SAS® Visual Analytics, SAS® Viya™, and SAS In-Memory Statistics for Hadoop®.

Classification model training application 222, controller application 312, and worker application 412 may be the same or different applications that are integrated in various manners to train a classification model using each training data subset 414 and, optionally, training data subset 314.

The training dataset may include, for example, a plurality of rows and a plurality of columns. The plurality of rows may be referred to as observation vectors or records (observations), and the columns may be referred to as variables. In an alternative embodiment, the training dataset may be transposed. The plurality of variables defines a vector $x_i$ for each observation vector i=1, 2, . . . , N, where N is a number of the observation vectors included in the training dataset. The training dataset includes a target variable value $y_i$ for each observation vector that indicates a label, or class, or other characteristic defined for the respective observation vector $x_i$. The training dataset may include additional variables that are not included in the plurality of variables.

The training dataset includes observation vectors that have been labeled or classified, for example, by a human or other machine learning labeling process. For example, the label or classification may indicate a class for the observation vector or otherwise indicate an identification of a characteristic of the observation vector. For example, a $y_i$ value may indicate the label determined for the observation vector $x_i$ such as what the observation vector $x_i$ in the form of text means, what the observation vector $x_i$ in the form of image data does or does not represent (i.e., text, a medical condition, an equipment failure, an intrusion, a terrain feature, etc.), what the observation vector $x_i$ in the form of sensor signal data does or does not represent (i.e., voice, speech, an equipment failure, an intrusion, a terrain feature, etc.), etc.

In data science, engineering, and statistical applications, data often consists of multiple measurements (across sensors, characteristics, responses, etc.) collected across multiple time instances (patients, test subjects, etc.). These measurements may be collected in the training dataset for analysis and processing. The training dataset may include data captured as a function of time for one or more physical objects. The data stored in the training dataset may be captured at different time points periodically, intermittently, when an event occurs, etc. The training dataset may include data captured at a high data rate such as 200 or more observation vectors per second for one or more physical objects. One or more columns of the training dataset may include a time and/or date value. The training dataset may include data captured under normal and abnormal operating conditions of the physical object.

One or more variables of the plurality of variables may describe a characteristic of a physical object. For example, if the training dataset includes data related to operation of a vehicle, the variables may include a type of vehicle, an oil pressure, a speed, a gear indicator, a gas tank level, a tire pressure for each tire, an engine temperature, a radiator level, etc. some or all of which may be measured by a sensor.

A sensor may measure a physical quantity in an environment to which the sensor is associated and generate a corresponding measurement datum that may be associated with a time that the measurement datum is generated. Illustrative sensors include a microphone, an infrared sensor, a radar, a pressure sensor, a temperature sensor, a position or location sensor, a voltage sensor, a current sensor, a frequency sensor, a humidity sensor, a dewpoint sensor, a camera, a computed tomography machine, a magnetic resonance imaging machine, an x-ray machine, an ultrasound machine, etc. that may be mounted to various components used as part of a system.

For example, the training dataset may include image data captured by medical imaging equipment (i.e., computed tomography image, magnetic resonance image, x-ray image, ultrasound image, etc.) of a body part of a living thing. A subset of the image data is labeled and captured in the training dataset, for example, as either indicating existence of a medical condition or non-existence of the medical condition. The training dataset may include a reference to image data that may be stored, for example, in an image file or in a video file, and the existence/non-existence label associated with each image file or video file. The training dataset may include a plurality of such references. The existence/non-existence label or other label may be defined by a clinician or expert in the field to which data stored in the training dataset relates.

The data stored in the training dataset may be received directly or indirectly from the source and may or may not be pre-processed in some manner. For example, the data may be pre-processed using an event stream processor such as the SAS® Event Stream Processing Engine (ESPE), developed and provided by SAS Institute Inc. of Cary, N.C., USA. For example, data stored in the training dataset may be generated as part of the Internet of Things (IoT), where things (e.g., machines, devices, phones, sensors) can be connected to networks and the data from these things collected and processed within the things and/or external to the things before being stored in the training dataset. For example, the IoT can include sensors in many different devices and types of devices, and high value analytics can be applied to identify hidden relationships and drive increased efficiencies. This can apply to both big data analytics and real-time analytics. Some of these devices may be referred to as edge devices and may involve edge computing circuitry. These devices may provide a variety of stored or generated data, such as network data or data specific to the network devices themselves. Again, some data may be processed with an ESPE, which may reside in the cloud or in an edge device before being stored in the training dataset.

The data stored in the training dataset may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art.

The training dataset may be stored in various compressed formats such as a coordinate format, a compressed sparse column format, a compressed sparse row format, etc. The data may be organized using delimited fields, such as comma or space separated fields, fixed width fields, using a SAS® dataset, etc. The SAS dataset may be a SAS® file stored in a SAS® library that a SAS® software tool creates and processes. The SAS dataset contains data values that are organized as a table of observation vectors (rows) and variables (columns) that can be processed by one or more SAS software tools.

The training dataset may be stored using various data structures as known to those skilled in the art including one or more files of a file system, a relational database, one or more tables of a system of tables, a structured query language database, etc. on controller device 104 and/or on worker system 106. Controller device 104 may coordinate access to the training dataset that is distributed across worker system 106 such that each worker device 400 stores a subset of the training dataset. For example, the training dataset may be stored in a cube distributed across a grid of computers as understood by a person of skill in the art. As another example, the training dataset may be stored in a multi-node Hadoop® class. For instance, Apache™ Hadoop® is an open-source software framework for distributed computing supported by the Apache Software Foundation. As another example, the training dataset may be stored in a cloud of computers and accessed using cloud computing technologies, as understood by a person of skill in the art. The SAS® LASR™ Analytic Server may be used as an analytic platform to enable multiple users to concurrently access data stored in the training dataset. The SAS Viya open, cloud-ready, in-memory architecture also may be used as an analytic platform to enable multiple users to concurrently access data stored in the training dataset. SAS CAS may be used as an analytic server with associated cloud services in SAS Viya. Some systems may use SAS In-Memory Statistics for Hadoop® to read big data once and analyze it several times by persisting it in-memory for the entire session. Some systems may be of other types and configurations.

Figure 5:
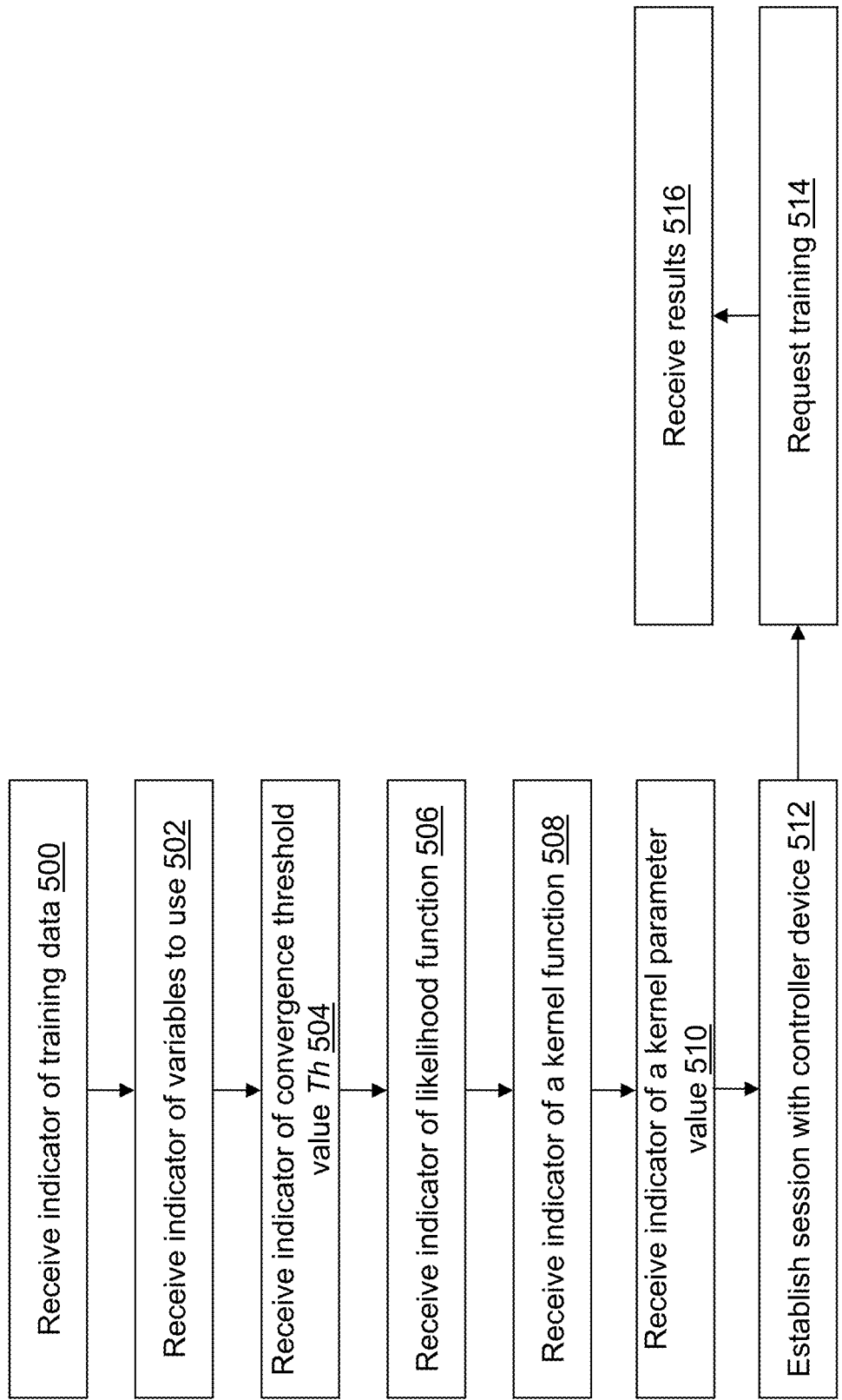
FIG. 5 depicts a flow diagram illustrating examples of operations performed by the user device of FIG. 2 in accordance with an illustrative embodiment.

Referring to FIG. 5, example operations associated with classification model training application 222 are described. Additional, fewer, or different operations may be performed depending on the embodiment of classification model training application 222. The order of presentation of the operations of FIG. 5 is not intended to be limiting. Some of the operations may not be performed in some embodiments. Although some of the operational flows are presented in sequence, the various operations may be performed in various repetitions and/or in other orders than those that are illustrated. For example, a user may execute classification model training application 222, which causes presentation of a first user interface window, which may include a plurality of menus and selectors such as drop-down menus, buttons, text boxes, hyperlinks, etc. associated with classification model training application 222 as understood by a person of skill in the art. The plurality of menus and selectors may be accessed in various orders. An indicator may indicate one or more user trainings from a user interface, one or more data entries into a data field of the user interface, one or more data items read from computer-readable medium 208 or otherwise defined with one or more default values, etc. that are received as an input by classification model training application 222.

In an operation 500, a first indicator may be received that indicates the training dataset. For example, the first indicator indicates a location and a name of the training dataset. As an example, the first indicator may be received by classification model training application 222 after selection from a user interface window or after entry by a user into a user interface window. In an alternative embodiment, the training dataset may not be selectable. For example, a most recently created dataset may be used automatically.

In an operation 502, a second indicator may be received that indicates the plurality of variables to use in the training dataset. For example, the second indicator may indicate one or more column numbers or one or more column names. As another option, all of the columns of the training dataset except a first or a last column may be assumed to be the plurality of variables. The plurality of variables are the variables that define each observation vector $x_i$. The first column, the last column, or another column may further be indicated as the target variable value $y_i$ associated with a respective $i^{th}$ observation vector.

In an operation 504, a third indicator of a convergence threshold value Th may be received. As an example, the third indicator may be received by classification model training application 222 after selection from a user interface window or after entry by a user into a user interface window. In an alternative embodiment, the third indicator may not be received. For example, a default value may be stored, for example, in computer-readable medium 208 and used automatically. In another alternative embodiment, the value of the convergence threshold value Th may not be selectable.

Instead, a fixed, predefined value may be used. For illustration, a default value of the convergence threshold value Th may be 0.000001 though other values may be used.

In an operation 506, a fourth indicator of a likelihood function l(y|f(x)) of y given f(x), where f(x) is a latent function value of x, may be received. For example, the fourth indicator indicates a name of a likelihood function. For illustration, the likelihood function l(y|f(x)) may be a sigmoid function. The fourth indicator may be received by classification model training application 222 after selection from a user interface window or after entry by a user into a user interface window. A default value for the likelihood function may further be stored, for example, in computer-readable medium 208. As an example, a likelihood function may be selected from "Logit", "Probit", etc. For example, a default likelihood function may be the Logit function. Of course, the likelihood function may be labeled or selected in a variety of different manners by the user as understood by a person of skill in the art. In an alternative embodiment, the likelihood function may not be selectable, and a single likelihood function is implemented in classification model training application 222. For example, the Logit function may be used by default or without allowing a selection. The Logit function may be defined as $$l(y|f(x)) = \frac{1}{1 + e^{-yf(x)}}.$$

The Probit function computes a $\tau^{th}$ quantile from a standard normal distribution $\mathcal{N}(\tau|0,1)$ and may be defined as l(y|f(x))=$\int_{-\infty}^{x} \mathcal{N}(\tau|0,1)d\tau$, where the predefined likelihood function computes a probability that the observation vector x is less than or equal to a $\tau^{th}$ quantile of the standard normal distribution.

In an operation 508, a fifth indicator of a kernel function $K_f$ may be received. For example, the fifth indicator indicates a name of a kernel function. The fifth indicator may be received by classification model training application 222 after selection from a user interface window or after entry by a user into a user interface window. A default value for the kernel function may further be stored, for example, in computer-readable medium 208. As an example, a kernel function may be selected from "Gaussian", "Exponential", "Linear", "Polynomial", "Matern", "Periodic", etc. For example, a default kernel function may be the Gaussian kernel function though any positive definite kernel function may be used. Of course, the kernel function may be labeled or selected in a variety of different manners by the user as understood by a person of skill in the art. In an alternative embodiment, the kernel function may not be selectable, and a single kernel function is implemented in classification model training application 222. For example, the Gaussian kernel function may be used by default or without allowing a selection. The Gaussian kernel function may be defined as $$K_f(x_i, x_j) = \exp\left(\frac{-\|x_i - x_j\|^2}{2s^2}\right),$$

where s is a kernel parameter that is termed a Gaussian bandwidth parameter.

In an operation 510, a sixth indicator of a kernel parameter value to use with the kernel function may be received. For example, a value for s, the Gaussian bandwidth parameter, may be received for the Gaussian kernel function. In an alternative embodiment, the sixth indicator may not be received. For example, a default value for the kernel parameter value may be stored, for example, in computer-readable medium 208 and used automatically or the kernel parameter value may not be used. In another alternative embodiment, the value of the kernel parameter may not be selectable. Instead, a fixed, predefined value may be used.

In an operation 512, a session is established with controller device 104 when user device 200 and controller device 104 are not integrated. User device 200 accepts commands from a user and relays instructions to controller device 104 when user device 200 and controller device 104 are not integrated. Controller device 104 establishes a communication network with the worker devices of worker system 106, sending instructions to each worker device 400 of worker system 106, collecting and aggregating the results of computations from each worker device 400 of worker system 106, and communicating final results to user device 200.

In an operation 514, training of the classification model is requested. When controller device 104 and user device 200 are integrated in the same computing device, training is initiated as described further referring to FIG. 6. The request may include zero or more of the values defined for the parameters indicated in operations 500 to 510 or zero or more of the values may be stored in a memory location known to controller device 104 when controller device 104 and user device 200 are not integrated in the same computing device.

In an operation 516, results may be received from controller device 104 when controller device 104 and user device 200 are not integrated in the same computing device. As another example, an indicator may be received that indicates that the training process is complete. For example, one or more output tables may be presented on display 216 when the training process is complete. As another option, display 216 may present a statement indicating that the training process is complete. The user can access the output tables in a predefined location. Illustrative results may include a posterior latent function, also referred to as global latent function $f_g$, that is defined by local latent functions defined by each worker device 400 of worker system 106.

Figure 6:
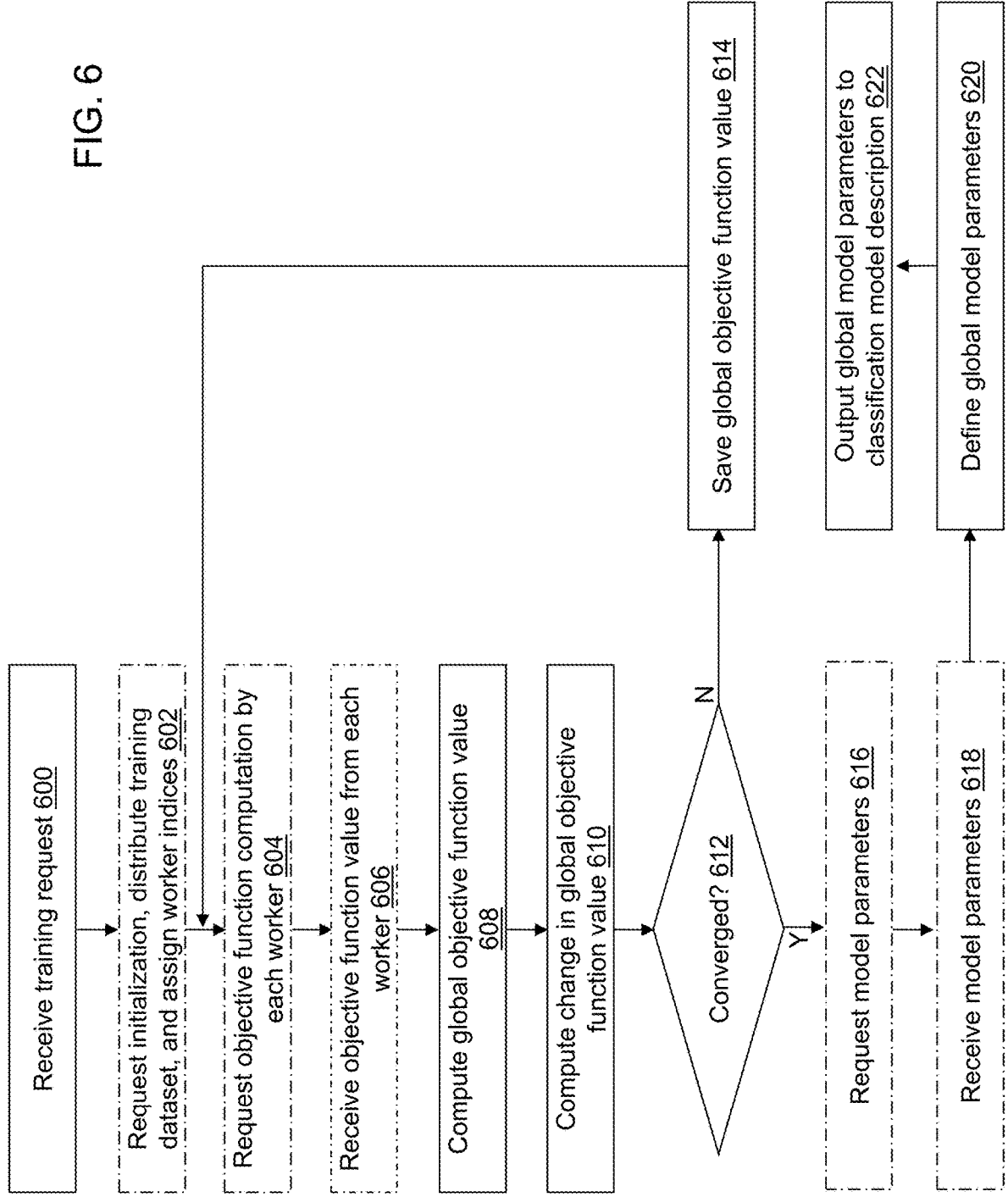
FIG. 6 depicts a flow diagram illustrating examples of operations performed by the controller device of FIG. 3 in accordance with an illustrative embodiment.

Referring to FIG. 6, example operations associated with controller application 312 are described. Additional, fewer, or different operations may be performed depending on the embodiment. The order of presentation of the operations of FIG. 6 is not intended to be limiting. Again, controller application 312 and classification model training application 222 may be integrated or be the same applications so that the operations of FIGS. 5 and 6 are merged.

In an operation 600, the training request may be received from user device 200 or directly from the user of user device 200 when controller device 104 and user device 200 are integrated in the same computing device. Values for the parameters indicated in operations 500 to 510 may be received from user device 200 or directly from the user of user device 200 when integrated or read from a known storage location. A previous objective function value $C_p$ may be initialized to zero.

In an operation 602, a request that each worker device 400 of worker system 106 perform initialization is sent. The request may be sent by a controller thread of controller device 104. The training dataset is further distributed across each worker device 400 of worker system 106 such that each worker device 400 has the same number of observation vectors if not already distributed. Again, controller device also may receive an equal portion of the training dataset stored in training data subset 314. When controller device receives the equal portion of the training dataset, $N_w=N_w+1$. When distribution of the initial number of observation vectors is not equal, a number of rows of zero observation vectors is added to make the distribution equal. Typically, the number of rows of zero observation vectors is added to training data subset 414 stored on $N_w^{th}$ worker computer 118-$N_w$. $N_{od}=N/N_w$ is a number of observation vectors distributed to each worker device 400 of worker system 106 and optionally controller device 104.

A unique worker index is assigned to each worker device 400 of worker system 106. For example, a worker index h=1 may be assigned to first worker computer 118-1, . . . , and a worker index h=$N_w$ may be assigned to $N_w^{th}$ worker computer 118-$N_w$. When controller device receives the equal portion of the training dataset, controller device 104 may be assigned worker index h=1, worker index h=2 may be assigned to first computer 118-1, . . . , and a worker index h=$N_w$ may be assigned to $N_w^{th}$ worker computer 118-$N_w$, where $N_w=N_w+1$ has already been performed. The request may include the worker index assigned to each worker device 400. Initialization processing by each worker device 400 is described in FIG. 7A.

In an operation 604, a request is sent to each worker device 400 of worker system 106 to compute an objective function value $C_h$ using training data subset 414 distributed to each worker device 400, where the subscript h indicates the index to the respective worker device 400 that may include controller device 104. The request may be sent by a controller thread of controller device 104. Processing by each worker device 400 to compute the objective function value $C_h$ is described in FIGS. 7B to 7D.

In an operation 606, the objective function value $C_h$ is received from each worker device 400 of worker system 106 that may include controller device 104. The values may be received by the controller thread of controller device 104.

In an operation 608, a global objective function value $C_g$ is computed by summing the objective function value $C_h$ received from each worker device 400. For example, $C_g = \Sigma_{h=1}^{N_w} C_h$.

In an operation 610, a change in the objective function value $\Delta C$ is computed, for example, using $\Delta C = |C_g - C_p|$.

In an operation 612, a determination is made concerning whether $\Delta C < Th$ such that the computations have converged. If $\Delta C < Th$, processing continues in an operation 616 to indicate convergence has been achieved. If $\Delta C \geq Th$, processing continues in an operation 614. In addition, or in the alternative, a number of iterations of operation 604 may be used to determine that processing is complete.

In operation 614, $C_p$ is updated for a next iteration using $C_p = C_g$, and processing continues in operation 604.

In operation 616, a request is sent to each worker device 400 of worker system 106 to provide model parameters, $W_h$, $D_h$, and $L_h$.

In an operation 618, the model parameters $W_h$, $D_h$, and $L_h$ are received from each worker device 400 of worker system 106, where $D_h$ and $W_h$ are vectors of length $N_{od}$, and $L_h$ is an $N_{od} \times (N_{od} \times h)$ matrix.

In an operation 620, the global model parameters $W_g$, $D_g$, and $L_g$ are defined. For example, $W_g$ is defined by concatenating the vector $W_h$ received from each worker device 400 in the order defined by the training dataset so that each entry of the vector $W_g$ corresponds to an observation vector read from the training dataset in the order stored in the training dataset. For example, $W_g = W_i$, i=1, 2, . . . , $N_w$. Similarly, $D_g$ is defined by concatenating the vector $D_h$ received from each worker device 400 in the order defined by the training dataset. For example, $D_g = D_i$, i=1, 2, . . . , $N_w$. $L_g$ is defined by stacking the matrices $L_h$ in the order defined by the training dataset, $L_g = L_i$, i=1, 2, . . . , $N_w$. The upper triangular matrix portion may be defined with all zeroes.

In an operation 622, the global model parameters $W_g$, $D_g$, and $L_g$ are output, for example, to classification model description 224, and an indicator sent to user device 200 indicating that model training is complete. The kernel function indicator and the kernel parameter indicator may further be output to classification model description 224. The variables to use identified in operation 502 may also be output to classification model description 224 for each observation vector included in the training dataset.

Referring to FIGS. 7A to 7E, example operations associated with worker application 412 are described. Additional, fewer, or different operations may be performed depending on the embodiment. The order of presentation of the operations of FIGS. 7A to 7E is not intended to be limiting. When controller device 104 is acting as a worker device, controller device 104 also executes the operations of FIGS. 7A to 7E with an assigned training data subset 414.

Figure 7A:
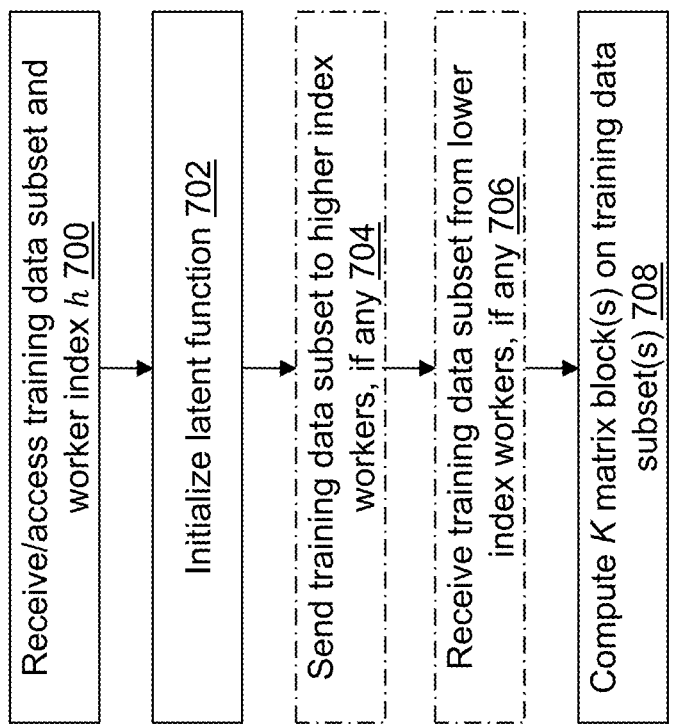
FIGS. 7A to 7E depict flow diagrams illustrating examples of operations performed by the worker device of FIG. 4 in accordance with an illustrative embodiment.

Referring to FIG. 7A, in an operation 700, the request to initialize is received from controller device 104 as a result of operation 602. The request may include the assigned worker index h and the parameters received in operations 500 to 510 or the parameter values may be otherwise provided to each worker in a known memory location or based on a default value. Training data subset 414 may already be stored on each worker device 400, may be received from another device such as controller device 104, may be accessed in a known location, etc. such that each worker device has training data subset 414 that includes $N_{od}$ observation vectors.

In an operation 702, the latent function vector $f$ is initialized, for example, using $f_i=0$, i=1, . . . , $N_{od}$ for each of the $N_{od}$ entries.

In an operation 704, training data subset 414 is downstream broadcast to downstream worker devices, if any, of worker system 106 that may include controller device 104. For example, when a data item is downstream broadcast, worker device 400 assigned worker index h=1, sends the data item to each other worker having indices h=2, . . . , $N_w$; worker device 400 assigned worker index h=2, sends the data item to each other worker having indices h=3, . . . , $N_w$; worker device 400 assigned worker index h=3, sends the data item to each other worker having indices h=4, . . . , $N_w$; and so on such that worker device 400 assigned worker index h=$N_w$ does not send the data item to any other worker device of worker system 106. Instead, worker device 400 assigned worker index h=$N_w$ receives the data item from each other worker device of worker system 106. Conversely, worker device 400 assigned worker index h=1 sends the data item to each other worker device of worker system 106, but does not receive the data item from any other worker device of worker system 106.

In an operation 706, training data subset 414 is received from upstream worker devices, if any, of worker system 106 that may include controller device 104. For example, as already stated, worker device 400 assigned worker index h=1 does not receive the data item from any other worker device of worker system 106; whereas, worker device 400 assigned worker index h=2, receives the data item from worker device 400 assigned worker index h=1; worker device 400 assigned worker index h=3, receives the data item from worker device 400 assigned worker index h=1 and from worker device 400 assigned worker index h=2; and so on such that worker device 400 assigned worker index h=$N_w$ receives the data item from each other worker device of worker system 106. Based on the downstream broadcasting, each worker device 400 receives $N_r$=h−1 blocks of observation vectors that each include $N_{od}$ observation vectors.

In an operation 708, h blocks of a kernel matrix K are computed using the observation vectors read from training data subset 414 or training data subset 314 and the $N_r$ blocks of observation vectors received from the upstream worker devices with the kernel function $K_f$ and kernel parameter value. Each block of kernel matrix $K_{hs}(x_{i,h}, x_{j,s})$, s=1, . . . , h is an $N_{od} \times N_{od}$ matrix computed using the kernel function $K_f$ and kernel parameter value with the associated $x_i$, $x_j$. For example, worker device 400 assigned worker index h=1 does not receive any blocks of observation vectors, so worker device 400 assigned worker index h=1 only computes $K_{11}(x_{i,1}, x_{j,1})$, i=1, $N_{od}$, j=1, . . . , $N_{od}$. For example, when $$K_f(x_i, x_j) = \exp\left(\frac{-\|x_i - x_j\|^2}{2s^2}\right),$$

$$K_{11}(x_{i,1}, x_{j,1}) = \exp\left(\frac{-\|x_{i,1} - x_{j,1}\|^2}{2s^2}\right),$$

i=1, . . . , $N_{od}$, j=1, . . . , $N_{od}$.

Worker device 400 assigned worker index h=2 receives a single block of observation vectors from worker device 400 assigned worker index h=1 referred to as $x_{1,1}$, i=1, . . . , $N_{od}$, $N_r$=1, so worker device 400 assigned worker index h=2 computes $K_{21}(x_{i,2}, x_{j,1})$, i=1, . . . , $N_{od}$, j=1, . . . , $N_{od}$ from the block of observations $x_{1,1}$ received from worker device 400 assigned worker index h=1. Worker device 400 assigned worker index h=2 also computes $K_{22}(x_{i,2}, x_{j,2})$, i=1, . . . , $N_{od}$, j=1, . . . , $N_{od}$.

Worker device 400 assigned worker index h=3 receives a block of observation vectors from worker device 400 assigned worker index h=1 and a block of observation vectors from worker device 400 assigned worker index h=2 referred to as $x_{i,2}$, i=1, . . . , $N_{od}$, $N_r$=2, so worker device 400 assigned worker index h=2 computes $K_{32}(x_{i,3}, x_{j,2})$, i=1, . . . , $N_{od}$, j=1, . . . , $N_{od}$ from the block of observations $x_{1,2}$ received from worker device 400 assigned worker index h=2, and $K_{31}(x_{i,3}, x_{j,1})$, i=1, . . . , $N_{od}$, j=1, . . . , $N_{od}$ from the block of observations $x_{j,1}$ received from worker device 400 assigned worker index h=1. Worker device 400 assigned worker index h=3 also computes $K_{33}(x_{i,3}, X_{j,3})$, i=1, . . . , $N_{od}$, j=1, . . . , $N_{od}$. Worker device 400 assigned worker index h=$N_w$ receives $N_w$−1 blocks of observation vectors to compute $K_{hs}(x_{i,h}, x_{j,s})$, s=1, . . . , h, i=1, . . . , $N_{od}$, j=1, . . . , $N_{od}$ and $K_{N_w N_w}(x_{i,N_w}, w_{j,N_w})$, i=1, . . . , $N_{od}$, j=1, . . . , $N_{od}$. $K_{hs}$ indicates an $hs^{th}$ block of the kernel matrix K, where h=1, . . . , $N_w$, s=1, h to define a lower triangular matrix K.

Figure 7B:
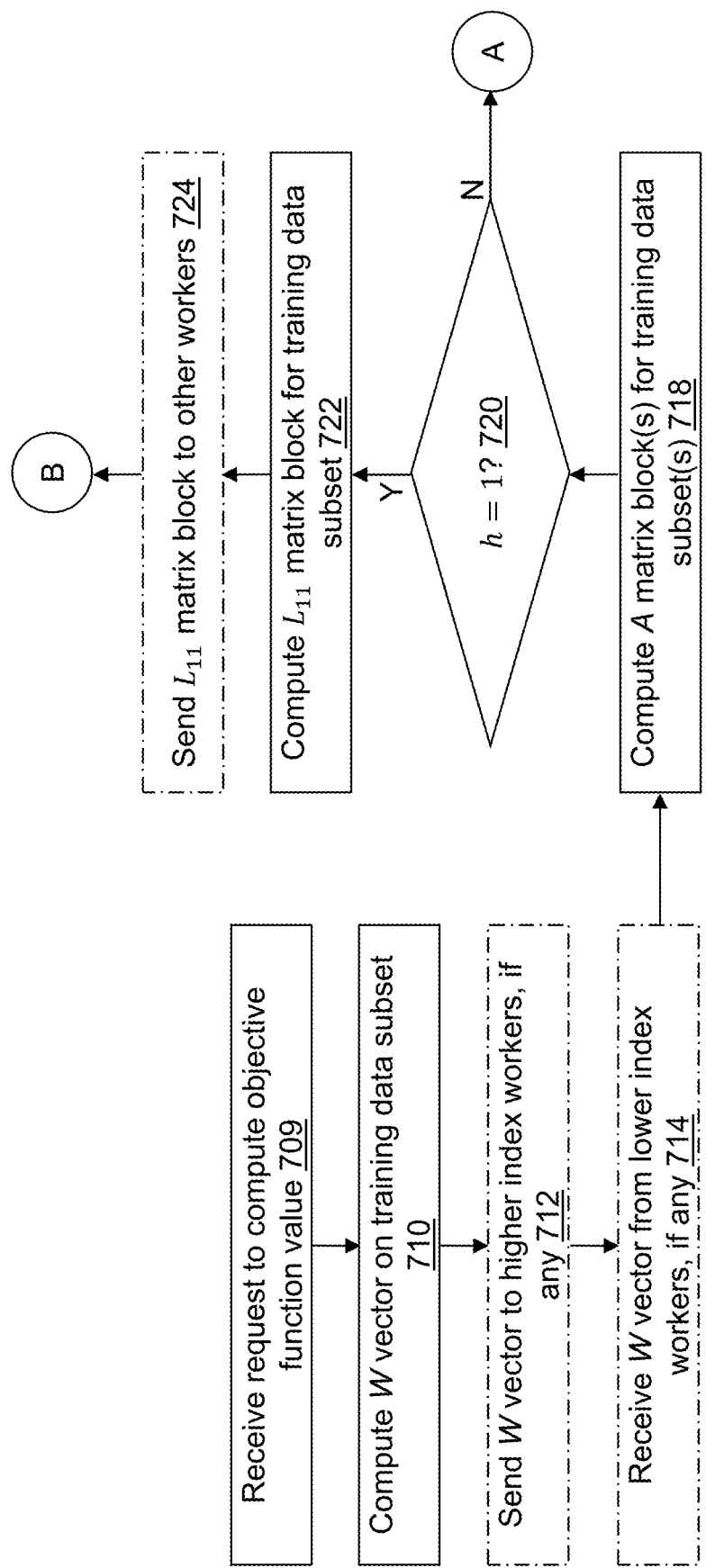

Referring to FIG. 7B, in an operation 709, the request to compute the objective function value is received from controller device 104 as a result of operation 604.

Similar to operation 708, in an operation 710, a $W_h$ vector is computed using the observation vectors read from training data subset 414 or training data subset 314 based on the likelihood function. The $W_h$ vector may be computed using $W_h = -\nabla\nabla \log l(y_i|f(x_i))$, i=1, . . . , $N_{od}$, where $\nabla\nabla$ indicates a Laplacian, which is a second order derivative matrix of a logarithm of the likelihood function, $l(y_i|f(x_i))$ is a likelihood function value computed using $f(x_i)$ given $y_i$, and $f(x_i)$ is the latent function value for an $i^{th}$ observation vector $x_i$ of training data subset 414 or training data subset 314. For example, when $$l(y_i|f(x_i)) = \frac{1}{1 + e^{-y_i f(x_i)}},$$

$$W_i = \frac{1}{1 + e^{-f(x_i)}}\left(1 - \frac{1}{1 + e^{-f(x_i)}}\right)$$

for the $i^{th}$ observation vector $x_i$. Usually, $$\pi_i = \frac{1}{1 + e^{-f(x_i)}}$$

is used as a probability to predict a '1' for $x_i$, so $W_i = \pi_i(1-\pi_i)$.

In an operation 712, the $W_h$ vector is downstream broadcast as described referring to operation 704.

In an operation 714, each $W_s$, s=1, $N_r$ vector is received as described referring to operation 706, where again worker device 400 assigned worker index h=1 does not receive any $W_s$ vector because $N_r$=0; worker device 400 assigned worker index h=2 receives only the $W_1$ vector from worker device 400 assigned worker index h=1 because $N_r$=1, worker device 400 assigned worker index h=3 receives the $W_1$ vector from worker device 400 assigned worker index h=1 and the $W_2$ vector from worker device 400 assigned worker index h=2 because $N_r$=2, and so on.

Similar to operation 708, in an operation 718, h blocks of a matrix A are computed using $A_{hh} = I + W_h^{0.5} K_{hh} W_h^{0.5}$ where I is an $N_{od} \times N_{od}$ identity matrix, and $A_{hs} = W_h^{0.5} K_{hs} W_s^{0.5}$, s=1, . . . , $N_r$. For example, worker device 400 assigned worker index h=1 only computes $A_{11} = I + W_1^{0.5} K_{11} W_1^{0.5}$; whereas, worker device 400 assigned worker index h=$N_w$ computes $A_{N_w N_w} = I + N_w^{0.5} K_{N_w N_w} W_{N_w}^{0.5}$ and $A_{N_w s} = W_{N_w}^{0.5} K_{N_w s} W_s^{0.5}$, s=1, . . . , $N_r$. $A_{hs}$ indicates an $hs^{th}$ block of matrix A. The matrix A stored at worker device 400 assigned worker index h has $N_{od}$ rows and $N_{od} \times h$ columns.

In an operation 720, a determination is made concerning whether h=1 such that worker device 400 is assigned worker index h=1. If h=1, processing continues in an operation 722. If h>1, processing continues in an operation 730 shown referring to FIG. 7C.

In operation 722, a Cholesky decomposition block $L_{11}$ is computed using, for example, $L_{11}$=cholesky($A_{11}$), where $L_{11}$ is an $N_{od} \times N_{od}$ identity matrix. Each block of Cholesky decomposition L is an $N_{od} \times N_{od}$ matrix. $L_{hs}$ indicates an $hs^{th}$ block of Cholesky decomposition matrix L.

Figure 7C:
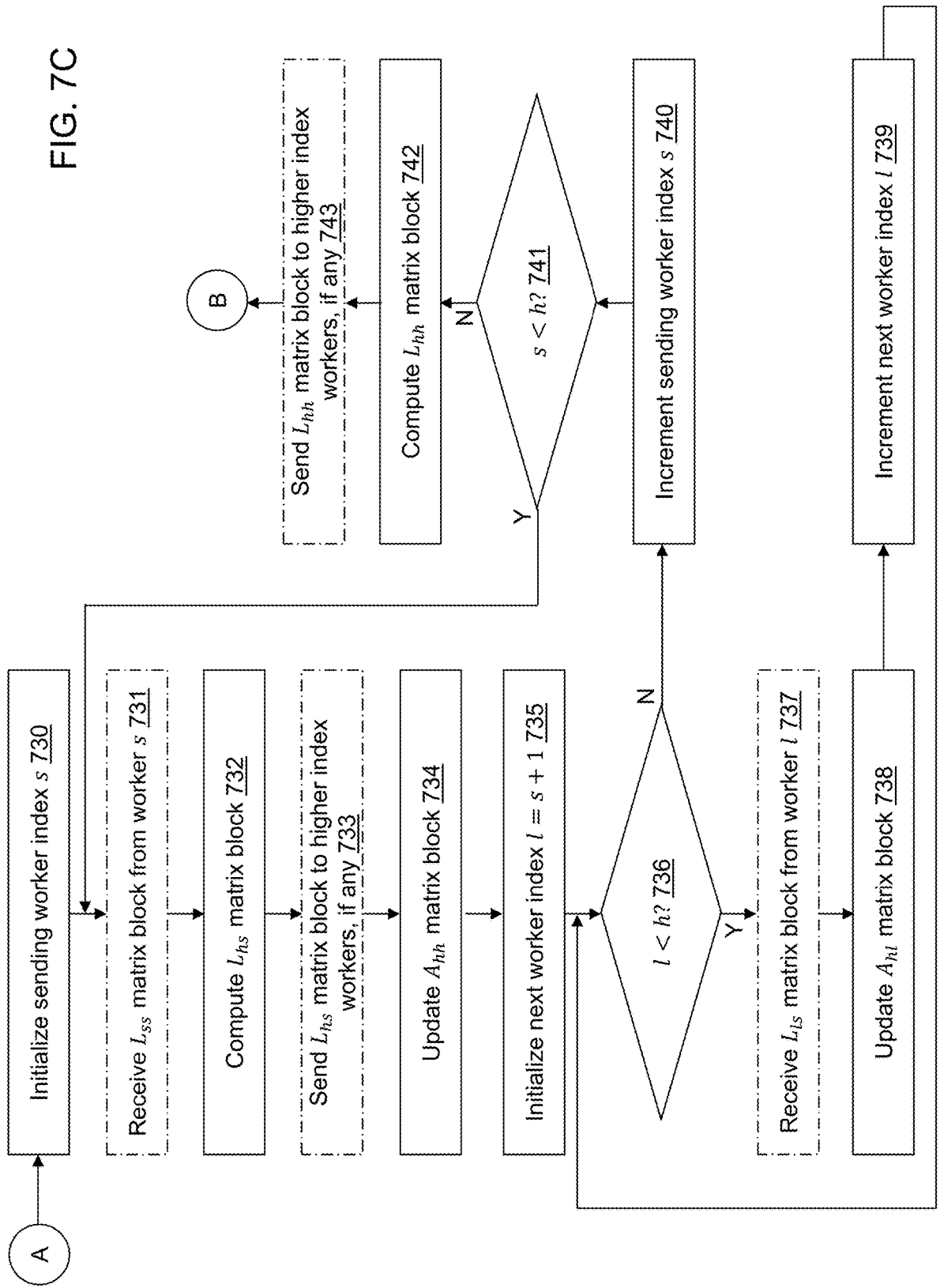
Figure 7D:
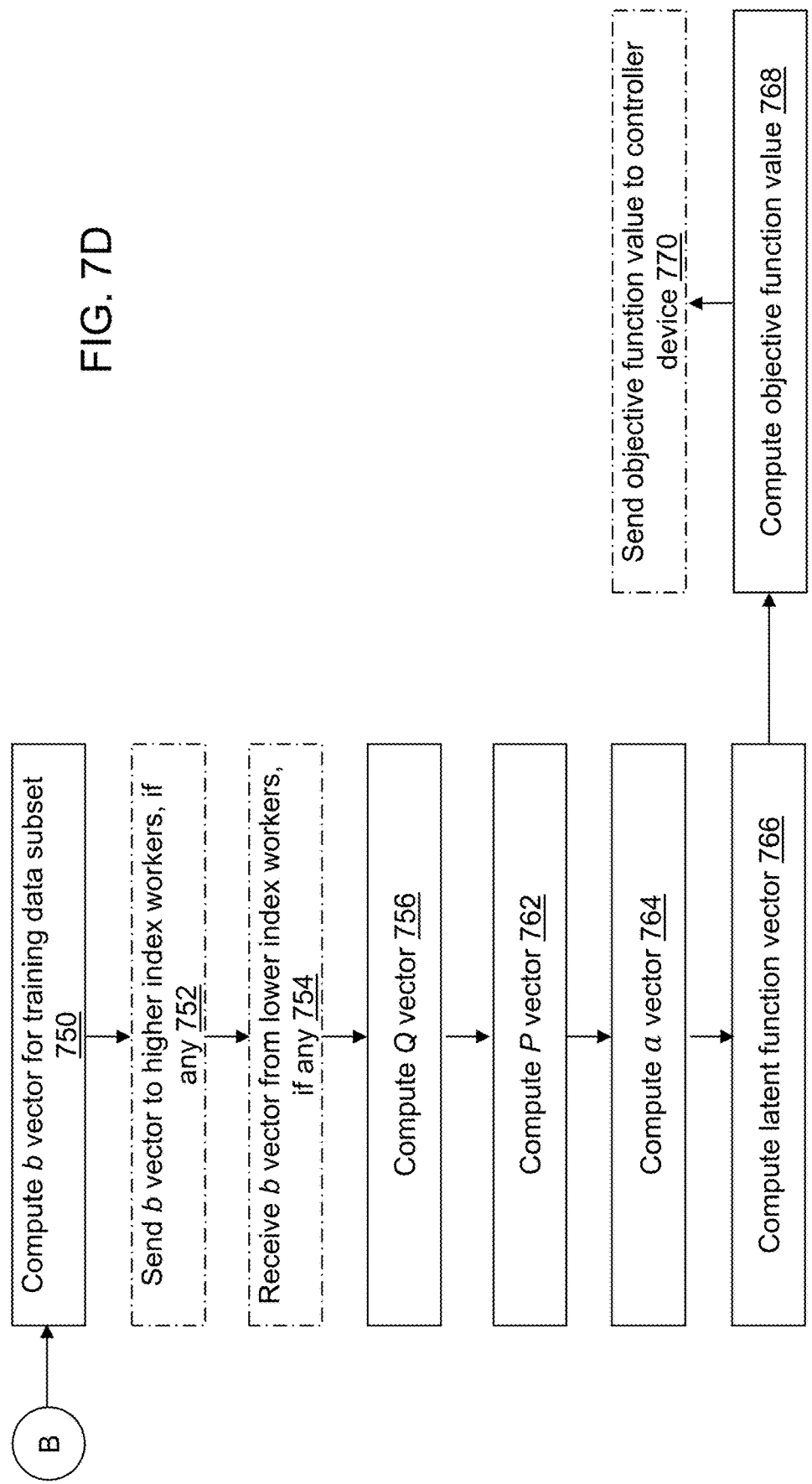

In an operation 724, the Cholesky decomposition block $L_{11}$ is sent to every other worker device 400 of worker system 106, and processing continues in an operation 750 shown referring to FIG. 7D for worker device 400 assigned worker index h=1.

Referring to FIG. 7C, in operation 730, a sending worker index s is initialized to s=1. Sending worker index s is used to indicate from which worker device 400 a Cholesky decomposition block is received.

In an operation 731, a Cholesky decomposition block $L_{ss}$ is received from worker device 400 assigned worker index s. For example, worker device 400 assigned worker index h=2 receives $L_{11}$ from worker device 400 assigned worker index h=1, worker device 400 assigned worker index h=3 receives $L_{11}$ from worker device 400 assigned worker index h=1, etc. on a respective first iteration of operation 731 by each respective worker device 400 indicated by worker index h.

In an operation 732, a Cholesky decomposition block $L_{hs}$ is computed using $L_{hs}=U_{ss}^{-1}A_{hs}$, where −1 indicates a matrix inverse. For example, worker device 400 assigned worker index h=2 computes $L_{21}$ using $L_{11}$ and $A_{21}$, worker device 400 assigned worker index h=3 computes $L_{31}$ using $L_{11}$ and $A_{31}$, etc. on a respective first iteration of operation 732.

In an operation 733, the Cholesky decomposition block $L_{hs}$ is downstream broadcast to downstream worker devices. For example, worker device 400 assigned worker index h=2 broadcasts $L_{21}$ to worker device 400 assigned worker index h=3, ..., $N_w$ on a respective first iteration of operation 733.

In an operation 734, the A matrix block $A_{hh}$ is updated, for example, using $A_{hh}=A_{hh}-L^T_{hs}L_{hs}$ where T indicates a matrix transpose.

In an operation 735, a next worker index l is initialized to l=s+1.

In operation 736, a determination is made concerning whether l<h such that worker device 400 assigned worker index h is done updating its A matrix blocks. If l<h, processing continues in an operation 737. If l≥h, processing continues in an operation 740.

In an operation 737, a Cholesky decomposition block $L_{ls}$ is received from worker device 400 assigned worker index l. For example, worker device 400 assigned worker index h=3 receives $L_{21}$ from worker device 400 assigned worker index h=2 on a respective first iteration of operation 737.

In an operation 738, the A matrix block $A_{hl}$ is updated, for example, using $A_{hl}=A_{hl}-L_{hs}^T L_{ls}$.

In an operation 739, the next worker index 1 is incremented to l=l+1, and processing continues in operation 736 to update the next matrix $A_{hl}$, if any.

In operation 740, the sending worker index s is incremented to s=s+1.

In an operation 741, a determination is made concerning whether s<h such that worker device 400 assigned worker index h is done updating its Cholesky computation blocks. If s<h, processing continues in operation 732 to continue updating Cholesky computation blocks. If s≥h, processing continues in an operation 742.

In operation 742, a Cholesky decomposition block $L_{hh}$=cholesky($A_{hh}$) is computed.

In an operation 743, the Cholesky decomposition block $L_{hh}$ is downstream broadcast to downstream worker devices, if any, and processing continues in operation 750 shown referring to FIG. 7C. For example, worker device 400 assigned worker index h=2 broadcasts $L_{22}$ to worker device 400 assigned worker index h=3, ..., $N_w$.

Operations 722, 724, and 730 to 743 compute blocks of the Cholesky decomposition matrix L where higher index workers perform computations on a greater number of blocks. The pseudocode below summarizes operations 722, 724, and 730 to 743 by worker system 106 for each respective worker index h.

for h∈{1,2, ..., $N_w$} do in serial
    On the $h^{th}$ worker, $L_{hh}$⇐cholesky($A_{hh}$).
    On the $h^{th}$ worker, downstream broadcast $L_{hh}$.
    Do in parallel on worker j∈{h+1, ..., $N_w$}
        On the $j^{th}$ worker, $L_{jh}$⇐$L_{hh}^{-1}A_{jh}$.
        On the $j^{th}$ worker, downstream broadcast $L_{jh}$.
    End do in parallel
    For j∈{h+1, ..., $N_w$} do in parallel
        Do in parallel on worker l∈{j, ..., $N_w$}
            On the $l^{th}$ worker, $A_{jl}$⇐$A_{jl}-L_{jh}^T L_{lh}$.
        End do in parallel
    End for
End for Referring to FIG. 7D, in operation 750, a $b_h$ vector is computed based on the likelihood function and has a length $N_{od}$. For example, $b_{h,i}=W_{h,i}f(x_i)+D_{h,i}$, i=1, 2, ..., $N_{od}$, where $b_{h,i}$ indicates an $i^{th}$ entry of the $b_h$ vector, $W_{h,i}$ indicates an $i^{th}$ entry of the $W_h$ vector, $f(x_i)$ is the latent function value for the $i^{th}$ observation vector $x_i$ of training data subset 414 or training data subset 314, $D_h$=∇ log l(y|f(x)), ∇ indicates a first derivative of a logarithm of the likelihood function, l(y|f(x)) is the likelihood function value computed using $f(x)$ given y, and $D_{h,i}$ indicates an $i^{th}$ entry of the $D_h$ vector computed for the $i^{th}$ observation vector $x_i$ of training data subset 414 or training data subset 314. For example, when $$l(y_i|f(x_i)) = \frac{1}{1+e^{-y_i f(x_i)}},$$

$b_i=W_if(x_i)+\log(1+e^{-y_i f(x_i)})$ for the $i^{th}$ observation vector $x_i$.

In an operation 752, the $b_h$ vector is downstream broadcast as described referring to operation 704.

In an operation 754, each $b_s$, s=1, ..., $N_r$, vector is received as described referring to operation 706.

Similar to operation 708, in an operation 756, a first intermediate vector Q is computed using Q=$L_h$\($W_h^{0.5}K_h$.b), where Q is an $N_{od}$×h length vector, $L_h$. indicates the h blocks of the Cholesky decomposition matrix stored on worker device 400 having dimension $N_{od}$×($N_{od}$×h), $K_h$. indicates the h blocks of the Kernel matrix stored on worker device 400 having dimension $N_{od}$×($N_{od}$×h), b indicates the $N_{od}$×h length vector defined by concatenating each vector using b=$b_s$, s=1, ..., h, and \ indicates division.

In an operation 758, the first intermediate vector Q is downstream broadcast as described referring to operation 704.

In an operation 762, a second intermediate vector P is computed using P=$L_h^T$\Q, where second intermediate vector P is an $N_{od}$ length vector and $L_h^T$ indicates the transpose of the h blocks of the Cholesky decomposition matrix having dimension ($N_{od}$×h)×$N_{od}$.

In an operation 764, an a vector is computed, for example, using a=$b_h-W_h^{0.5}$P, where a is an $N_{od}$ length vector.

In an operation 766, the latent function vector $f$ is computed using, for example, $f=K_{hh}a$, where $f$ is an $N_{od}$ length vector with one latent function value computed for each observation vector included in training data subset 414 or training data subset 314.

In an operation 768, the objective function value C is computed using, for example, C=$-0.5a^Tf+\Sigma_{i=1}^{N_{od}} \log l(y_i|f(x_i))$. For example, when $$l(y_i|f(x_i)) = \frac{1}{1+e^{-y_i f(x_i)}},$$

C=$-0.5a^Tf-\Sigma_{i=1}^{N_{od}} \log(1+e^{-y_i f(x_i)})$ for the $i^{th}$ observation vector $x_i$.

In an operation 770, the objective function value C is returned to controller device 104.

Figure 7E:
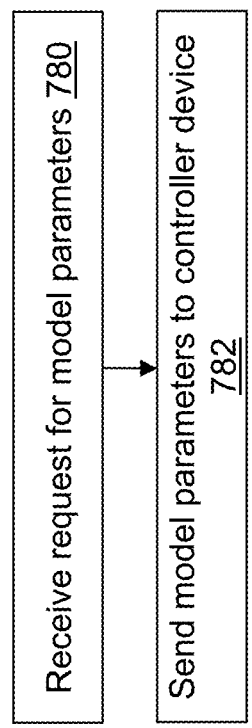

Referring to FIG. 7E, in an operation 780, the request to provide model parameters is received from controller device 104 as a result of operation 616.

In an operation 782, $W_h$, $D_h$, and $L_h$ are returned to controller device 104 or otherwise output for storage in classification model description 224.

The operations of FIGS. 5, 6, and 7A to 7E result in a trained classification model. Information describing the trained classification model is stored in classification model description 224 by either or both of user device 200 or controller device 104.

Figure 8:
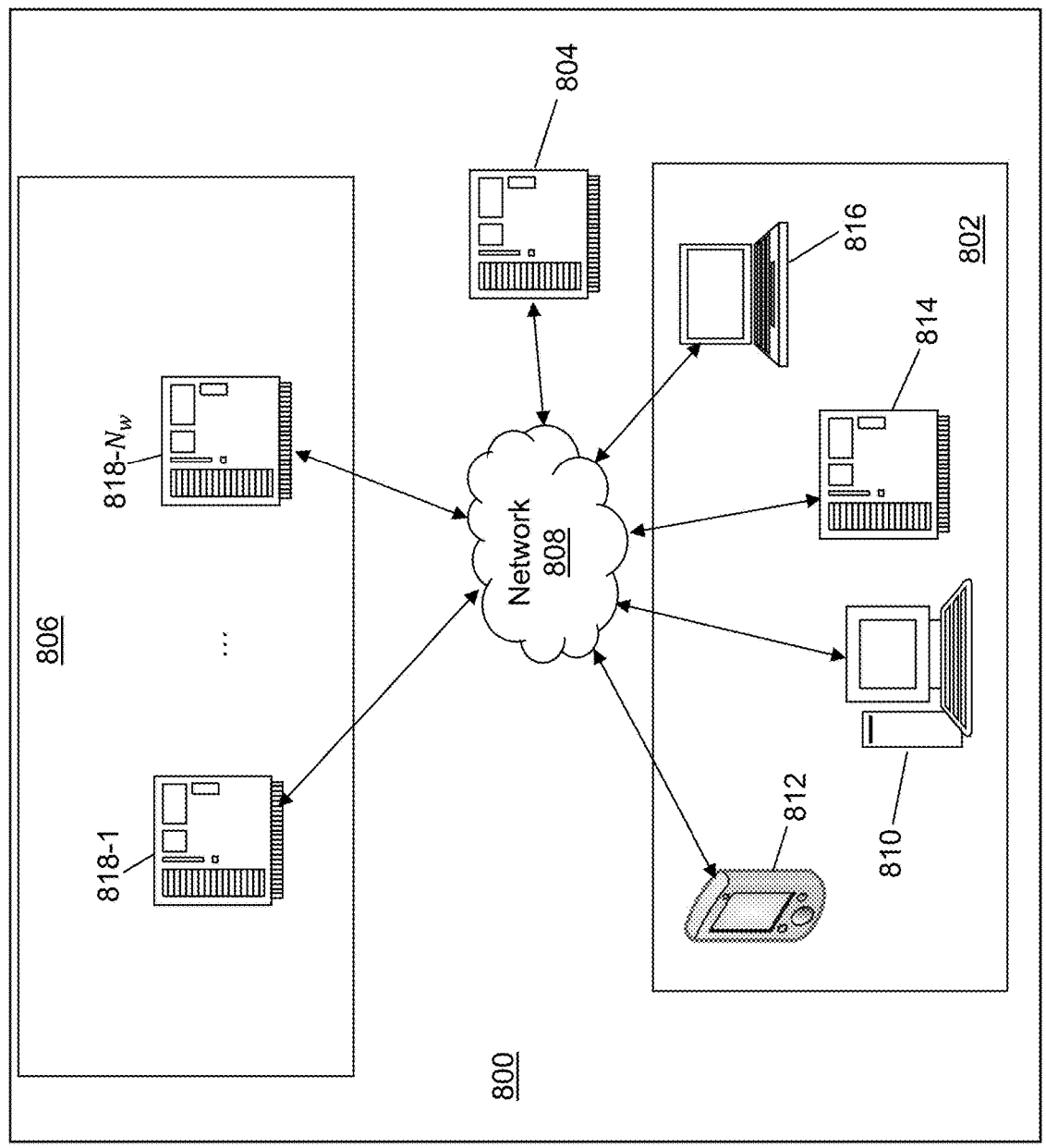
FIG. 8 depicts a block diagram of a classification system in accordance with an illustrative embodiment.

Referring to FIG. 8, a block diagram of a classification system 800 is shown in accordance with an illustrative embodiment. In an illustrative embodiment, classification system 800 may include a second user system 802, a second controller device 804, a second worker system 806, and a second network 808. Classification system 800 uses the trained classification model stored in classification model description 224 to classify data stored in input data that is distributed across second worker system 806. Classification system 800 and classification model training system 100 may be composed of the same computing devices or otherwise integrated into a single system or may be distinct systems.

Each of second user system 802, second controller device 804, and second worker system 806 may be composed of one or more discrete computing devices in communication through second network 808. Second user system 802 and second controller device 804 may be integrated into a single computing device.

Second network 808 may include one or more networks of the same or different types. Second network 808 can be any type of wired and/or wireless public or private network including a cellular network, a local area network, a wide area network such as the Internet or the World Wide Web, etc. Second network 808 further may comprise sub-networks and consist of any number of communication devices.

The one or more computing devices of second user system 802 may include computing devices of any form factor such as a desktop 810, a smart phone 812, a server computer 814, a laptop 816, a personal digital assistant, an integrated messaging device, a tablet computer, etc. Second user system 802 can include any number and any combination of form factors of computing devices that may be organized into subnets. The computing devices of second user system 802 may send and receive signals through second network 808 to/from another of the one or more computing devices of second user system 802 and/or to/from second controller device 804. The one or more computing devices of second user system 802 may communicate using various transmission media that may be wired and/or wireless as understood by those skilled in the art. The one or more computing devices of second user system 802 may be geographically dispersed from each other and/or co-located.

Figure 9:
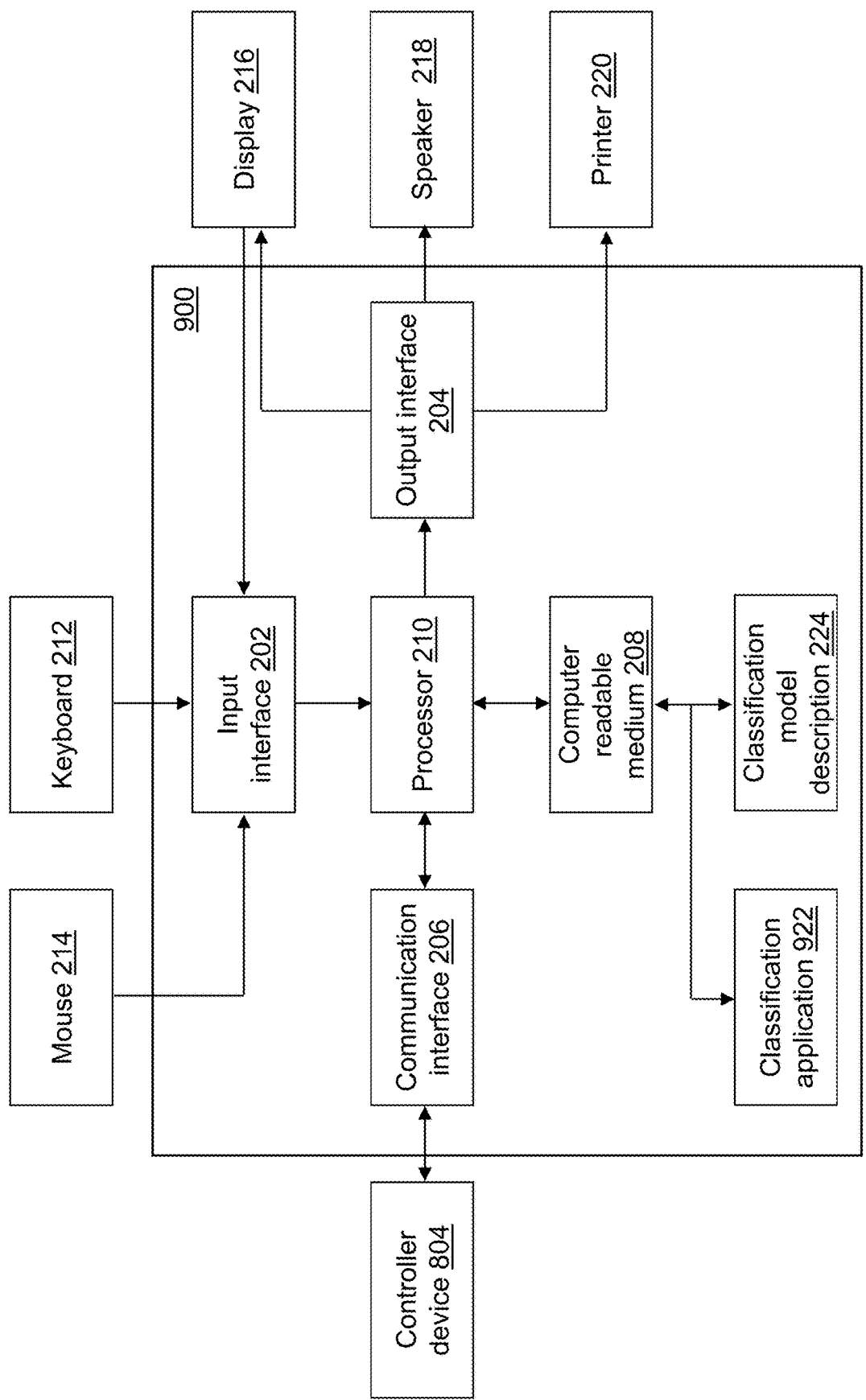
FIG. 9 depicts a block diagram of a user device of the classification system of FIG. 8 in accordance with an illustrative embodiment.

For illustration, referring to FIG. 9, a block diagram of a second user device 900 is shown in accordance with an example embodiment. Second user device 900 is an example computing device of second user system 802. For example, each of desktop 810, smart phone 812, server computer 814, and laptop 816 may be an instance of second user device 900. Similar to user device 200, second user device 900 may include input interface 202, output interface 204, communication interface 206, non-transitory computer-readable medium 208, processor 280, a classification application 922, and classification model description 224. Each computing device of second user system 802 may be executing classification application 922 of the same or different type. Second user device 900 may execute classification application 922 that triggers creation of classification output data for the input data.

Referring again to FIG. 8, second controller device 804 can include any form factor of computing device. For illustration, FIG. 8 represents second controller device 804 as a server computer. Second controller device 804 may send and receive signals through second network 808 to/from second user system 802 and/or to/from second worker system 806. Second controller device 804 may communicate using various transmission media that may be wired and/or wireless as understood by those skilled in the art. Second controller device 804 may be implemented on a plurality of computing devices of the same or different type. Classification system 800 further may include a plurality of controller devices.

Figure 10:
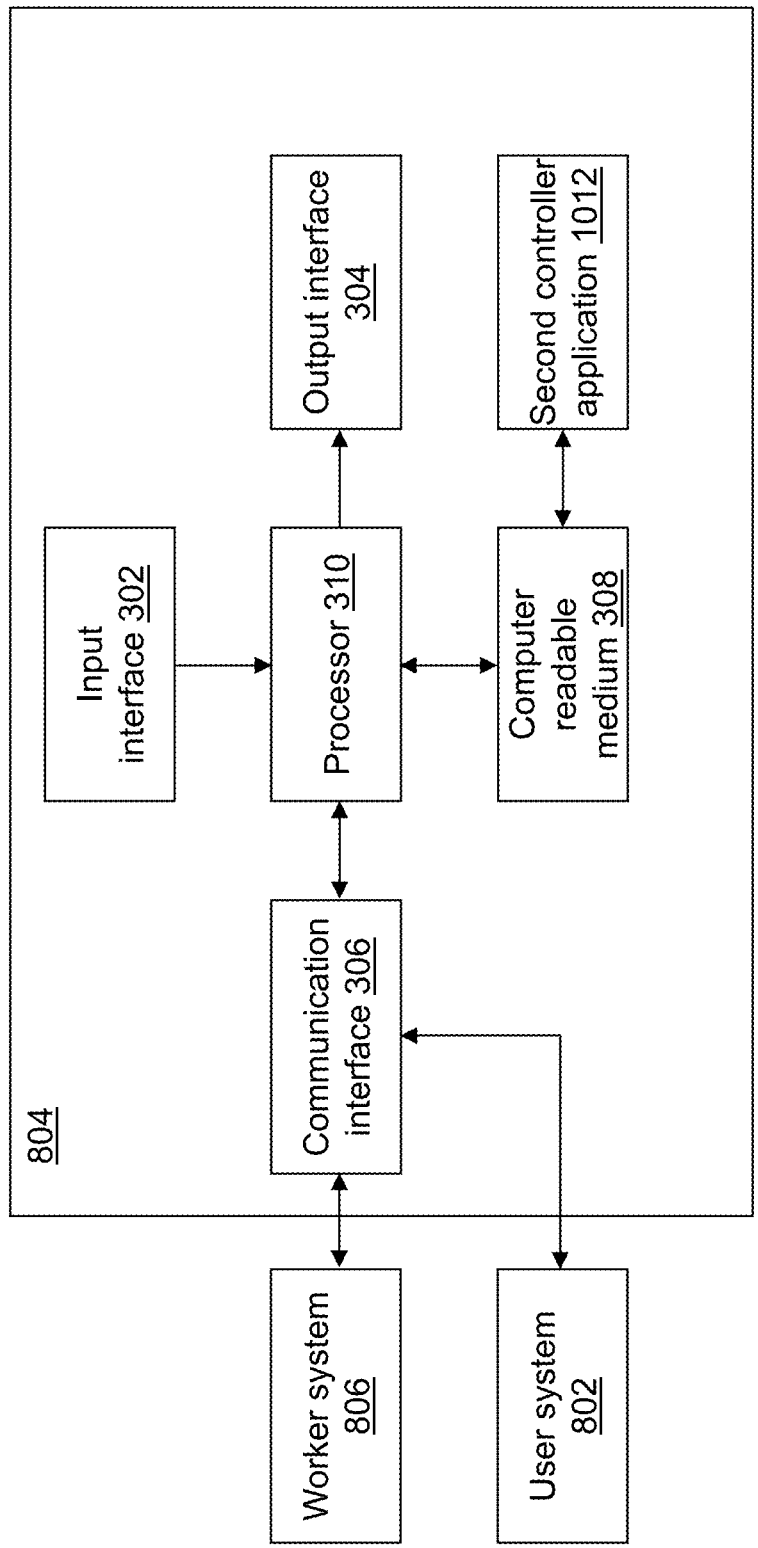
FIG. 10 depicts a block diagram of a controller device of the classification system of FIG. 8 in accordance with an illustrative embodiment.

For illustration, referring to FIG. 10, a block diagram of second controller device 804 is shown in accordance with an illustrative embodiment. Similar to controller device 104, second controller device 804 may include second input interface 302, second output interface 304, second communication interface 306, second computer-readable medium 308, second processor 380, and a second controller application 1012.

Referring again to FIG. 8, the one or more computing devices of second worker system 806 may include computers of any form factor such as a desktop, a server, a laptop, etc. For example, in the illustrative embodiment, second worker system 806 includes a first worker computer 818-1, . . . , and an $N_w^{th}$ worker computer 818-$N_w$. Each worker computer may support use of a plurality of threads. The computing devices of second worker system 806 may send and receive signals through second network 808 to/from second controller device 804 and/or to/from another computing device of second worker system 806. The one or more computing devices of second worker system 806 may be geographically dispersed from each other and/or co-located. The one or more computing devices of second worker system 806 may communicate using various transmission media that may be wired and/or wireless as understood by those skilled in the art.

Figure 11:
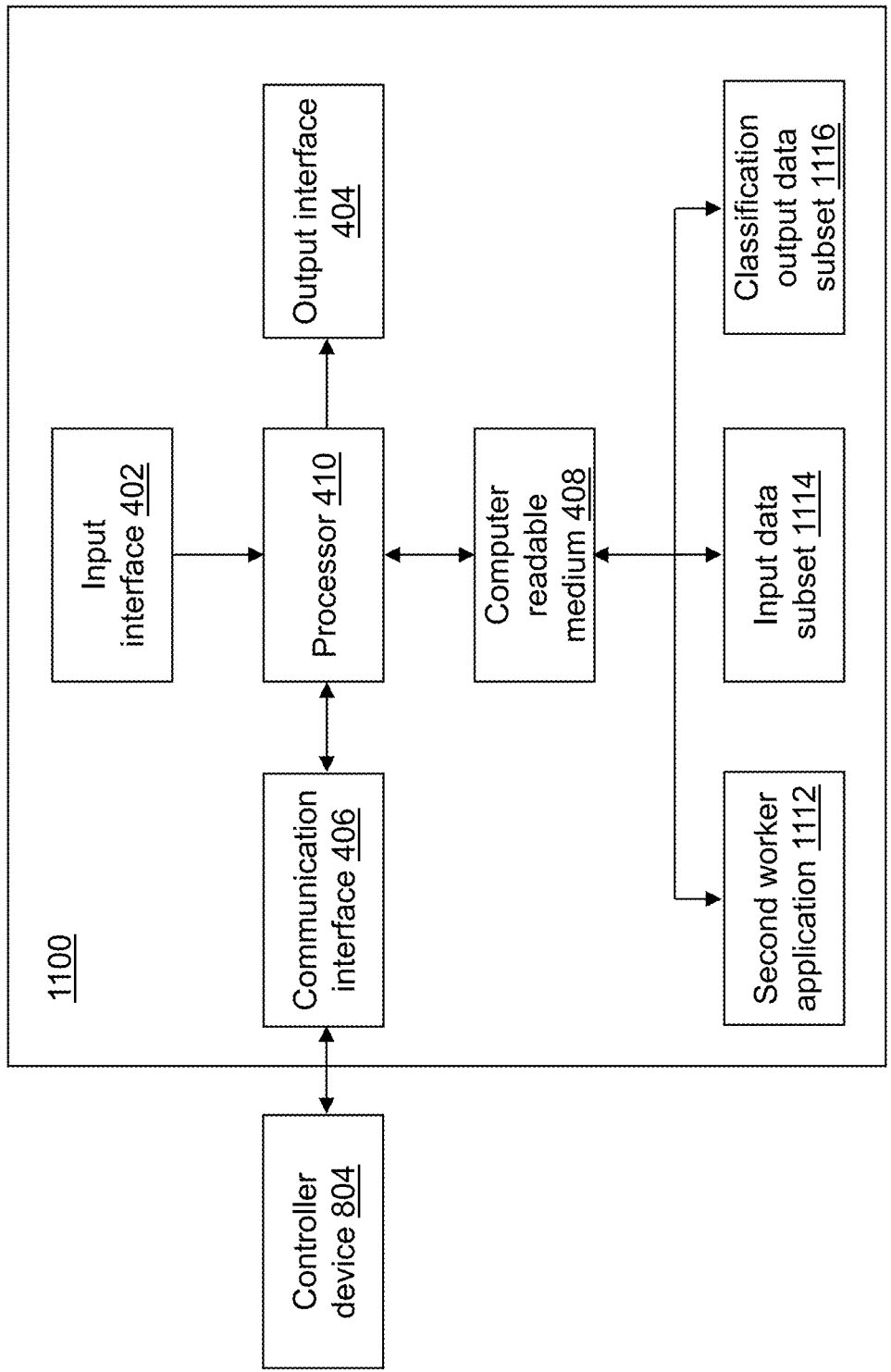
FIG. 11 depicts a block diagram of a worker device of the classification system of FIG. 8 in accordance with an illustrative embodiment.

For illustration, referring to FIG. 11, a block diagram of a second worker device 1100 is shown in accordance with an example embodiment. Second worker device 1100 is an example computing device of second worker system 806. For example, each of first worker computer 818-1, . . . , and $N_w^{th}$ worker computer 818-$N_w$ may be an instance of second worker device 1100. Similar to worker device 400, second worker device 1100 may include third input interface 402, third output interface 404, third communication interface 406, third computer-readable medium 408, third processor 480, a second worker application 1112, an input data subset 1114, a classification output data subset 1116, and classification model description 224. The input data may be distributed into input data subset 1114 distributed across each second worker device 1100 of second worker system 806. In an alternative embodiment, second controller device 804 may also be used to perform the operations described for each second worker device 1100 with a portion of the input data distributed to second controller device 804.

Referring again to FIG. 9, each second user device 900 of second user system 802 may include the same or different components and combinations of Classification application 922 performs operations associated with classifying observations included in data stored in the input data distributed into input data subset 1114 stored on each second worker device 1100 of second worker system 806. The classification for each observation vector may be stored in a respective classification output data subset 1116. Data describing the trained classification model may be read from classification model description 224 and used to determine each classification. Some or all of the operations described herein may be embodied in classification application 922. The operations may be implemented using hardware, firmware, software, or any combination of these methods.

Referring to the example embodiment of FIG. 9, classification application 922 is implemented in software (comprised of computer-readable and/or computer-executable instructions) stored in computer-readable medium 208 and accessible by processor 280 for execution of the instructions that embody the operations of classification application 922. Classification application 922 may be written using one or more programming languages, assembly languages, scripting languages, etc. Classification application 922 may be implemented as a Web application.

Classification application 922 may be integrated with other analytic tools. As an example, classification application 922 may be part of an integrated data analytics software application and/or software architecture such as that offered by SAS Institute Inc. of Cary, N.C., USA. Merely for illustration, classification application 922 may be implemented using or integrated with one or more SAS software tools such as JMP®, Base SAS, SAS® Enterprise Miner™, SAS® Event Stream Processing, SAS/STAT®, SAS® High Performance Analytics Server, SAS® Visual Data Mining and Machine Learning, SAS® LASR™, SAS® In-Database Products, SAS® Scalable Performance Data Engine, SAS® CAS, SAS/OR®, SAS/ETS®, SAS® Visual Analytics, SAS® Viya™, SAS In-Memory Statistics for Hadoop®, etc.

Referring to FIG. 10, fewer, different, or additional components may be incorporated into second controller device 804. Second controller application 1012 performs operations associated with coordinating the classification based on inputs provided from second user device 900 using the computing devices of second worker system 806. The operations may be implemented using hardware, firmware, software, or any combination of these methods. Referring to the example embodiment of FIG. 10, second controller application 1012 is implemented in software (comprised of computer-readable and/or computer-executable instructions) stored in second computer-readable medium 308 and accessible by second processor 380 for execution of the instructions that embody the operations of second controller application 1012. Second controller application 1012 may be written using one or more programming languages, assembly languages, scripting languages, etc. Second controller application 1012 may be implemented as a Web application.

Second controller application 1012 may be integrated with other analytic tools. As an example, second controller application 1012 may be part of an integrated data analytics software application and/or software architecture. For example, second controller application 1012 may be part of SAS® CAS. Merely for further illustration, second controller application 1012 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Visual Data Mining and Machine Learning, SAS® Visual Analytics, SAS® Viya™, SAS In-Memory Statistics for Hadoop®, etc.

Referring to FIG. 11, fewer, different, and additional components may be incorporated into second worker device 1100. Each second worker device 1100 of second worker system 806 may include the same or different components or combination of components. Second worker application 1112 may be integrated with other analytic tools. As an example, second worker application 1112 may be part of an integrated data analytics software application and/or software architecture. For example, second worker application 1112 may be part of SAS® CAS. Merely for further illustration, second worker application 1112 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Visual Data Mining and Machine Learning, SAS® Visual Analytics, SAS® Viya™, SAS In-Memory Statistics for Hadoop®, etc.

Classification application 922, second controller application 1012, and second worker application 1112 may be the same or different applications that are integrated in various manners to classify or otherwise label data stored in the input data. Classification application 922, second controller application 1012, and second worker application 1112 further may be the same or different applications that are integrated in various manners with classification model training application 222, controller application 312, and worker application 412, respectively.

Similar to the training dataset, the input data may include, for example, a plurality of rows and a plurality of columns. The plurality of rows may be referred to as observation vectors or records (observations), and the columns may be referred to as variables. In an alternative embodiment, the input data may be transposed. The plurality of variables define a vector $x_i$ for each observation vector i=1, . . . , N, where N is a number of the observation vectors included in the input data. The input data may include additional variables that are not included in the plurality of variables. One or more variables of the plurality of variables may describe a characteristic of a physical object. The observations included in the input data are unlabeled or unclassified.

The input data may include data captured as a function of time for one or more physical objects. The data stored in the input data may be captured at different time points periodically, intermittently, when an event occurs, etc. The input data may include data captured at a high data rate such as 200 or more observation vectors per second for one or more physical objects. One or more columns of the input data may include a time and/or date value. The input data may include data captured under normal and abnormal operating conditions of the physical object.

The data stored in the input data may be received directly or indirectly from the source and may or may not be pre-processed in some manner. For example, the data may be pre-processed using an ESPE. For example, data stored in the input data may be generated as part of the IoT.

The data stored in the input data may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art.

The input data may be stored in various compressed formats such as a coordinate format, a compressed sparse column format, a compressed sparse row format, etc. The data may be organized using delimited fields, such as comma or space separated fields, fixed width fields, using a SAS® dataset, etc.

The input data may be stored using various data structures as known to those skilled in the art including one or more files of a file system, a relational database, one or more tables of a system of tables, a structured query language database, etc. on second controller device 804 and/or on second worker system 806. Second controller device 804 may coordinate access to the input data that is distributed across second worker system 806 such that each second worker device 1100 stores a subset of the input data. For example, the input data may be stored in a cube distributed across a grid of computers as understood by a person of skill in the art. As another example, the input data may be stored in a multi-node Hadoop® class. As another example, the input data may be stored in a cloud of computers and accessed using cloud computing technologies, as understood by a person of skill in the art. The SAS® LASR™ Analytic Server may be used as an analytic platform to enable multiple users to concurrently access data stored in the input data. The SAS Viya open, cloud-ready, in-memory architecture also may be used as an analytic platform to enable multiple users to concurrently access data stored in the input data. SAS CAS may be used as an analytic server with associated cloud services in SAS Viya. Some systems may be of other types and configurations.

Figure 12:
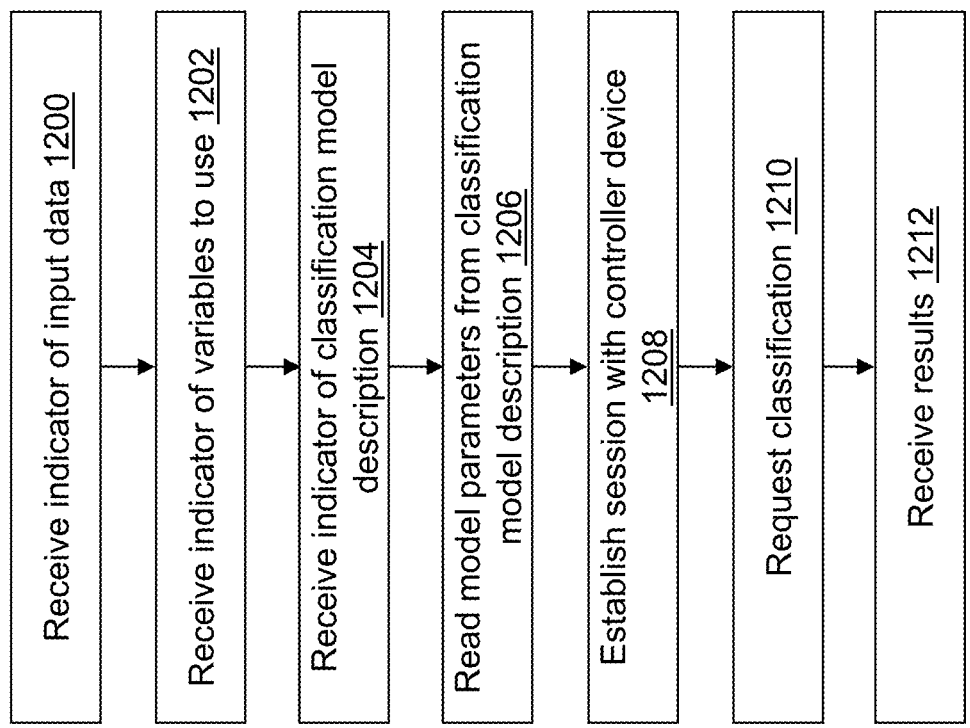
FIG. 12 depicts a flow diagram illustrating examples of operations performed by the user device of FIG. 9 in accordance with an illustrative embodiment.

Referring to FIG. 12, example operations associated with classification application 922 are described. Additional, fewer, or different operations may be performed depending on the embodiment of classification application 922. The order of presentation of the operations of FIG. 12 is not intended to be limiting. Some of the operations may not be performed in some embodiments. Although some of the operational flows are presented in sequence, the various operations may be performed in various repetitions and/or in other orders than those that are illustrated. For example, a user may execute classification application 922, which causes presentation of a first user interface window, which may include a plurality of menus and selectors such as drop-down menus, buttons, text boxes, hyperlinks, etc. associated with classification application 922 as understood by a person of skill in the art. The plurality of menus and selectors may be accessed in various orders.

In an operation 1200, a seventh indicator may be received that indicates the input data. For example, the seventh indicator indicates a location and a name of the input data. As an example, the seventh indicator may be received by classification application 922 after selection from a user interface window or after entry by a user into a user interface window. In an alternative embodiment, the input data may not be selectable. For example, a most recently created dataset may be used automatically.

In an operation 1202, an eighth indicator may be received that indicates the plurality of variables to use in the input data. For example, the eighth indicator may indicate one or more column numbers or one or more column names. As another option, all of the columns of the input data may be assumed to be the plurality of variables. The plurality of variables are the variables that define each observation vector $x_i$.

In an operation 1204, a ninth indicator may be received that indicates classification model description 224. For example, the ninth indicator indicates a location and a name of classification model description 224. As an example, the ninth indicator may be received by classification application 922 after selection from a user interface window or after entry by a user into a user interface window. In an alternative embodiment, classification model description 224 may not be selectable. For example, a classification model description 224 may be stored in a known location and used automatically.

In an operation 1206, global model parameters are read from classification model description 224. For example, the training dataset, the global W vector %, the global Cholesky decomposition $L_g$, and the global D vector $D_g = \nabla \log l(y_i | f(x_i))$, $i=1, 2, \ldots, N_T$ are read from classification model description 224, where $N_T$ is a number of the observation vectors included in the training dataset. The global Cholesky decomposition $L_g$ is an $N_T \times N_T$ matrix. $W_g$ and $D_g$ are $N_T$ dimensional vectors.

In an operation 1208, a session is established with second controller device 804 when second user device 900 and second controller device 804 are not integrated. Second user device 900 accepts commands from a user and relays instructions to second controller device 804 when second user device 900 and second controller device 804 are not integrated. Second controller device 804 establishes a communication network with the worker devices of second worker system 806, sending instructions to each second worker device 1100 of second worker system 806, collecting and aggregating the results of computations from each second worker device 1100 of second worker system 806, and communicating final results to second user device 900.

In an operation 1210, classification of the input data is requested. When second controller device 804 and second user device 900 are integrated in the same computing device, classification is initiated as described further referring to FIG. 13. The request may include zero or more of the values defined for the parameters indicated in operations 1200 to 1204 and those read from classification model description 224 or zero or more of the values may be stored in a memory location known to second controller device 804 when second controller device 804 and second user device 900 are not integrated in the same computing device.

In an operation 1212, results may be received from second controller device 804 when second controller device 804 and second user device 900 are not integrated in the same computing device. As another example, an indicator may be received that indicates that the classification process is complete. For example, one or more output tables may be presented on display 216 when the classification process is complete. As another option, display 216 may present a statement indicating that the classification process is complete. The user can access the output tables in a predefined location.

Figure 13:
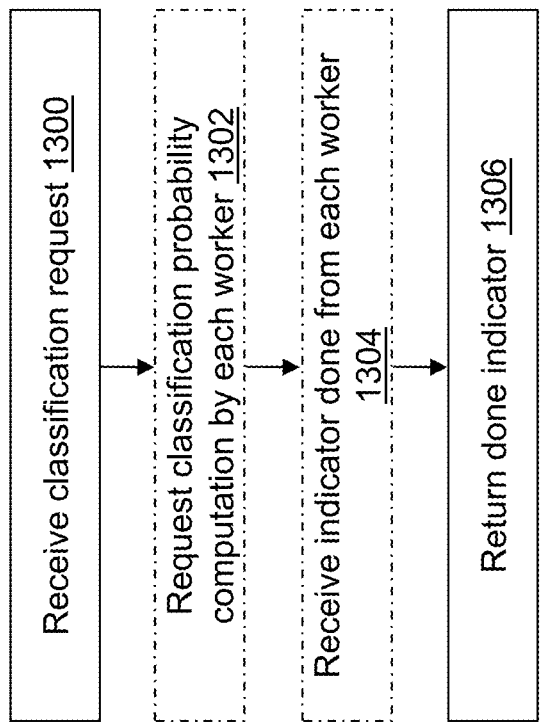
FIG. 13 depicts a flow diagram illustrating examples of operations performed by the controller device of FIG. 10 in accordance with an illustrative embodiment.

Referring to FIG. 13, example operations associated with second controller application 1012 are described. Additional, fewer, or different operations may be performed depending on the embodiment. The order of presentation of the operations of FIG. 13 is not intended to be limiting. Again, second controller application 1012 and classification application 922 may be integrated or be the same applications so that the operations of FIGS. 12 and 13 are merged.

In an operation 1300, the classification request may be received from second user device 900 or directly from the user of second user device 900 when second controller device 804 and second user device 900 are integrated in the same computing device. Values for the parameters indicated in operations 1200 to 1204 and those read from classification model description 224 may be received from second user device 900 or directly from the user of second user device 900 when integrated or may be read from a known storage location. The input data may already be distributed across second worker system 806 into each input data subset 1114. If not, second controller device 804 may request that the input data may be distributed across second worker system 806 into each input data subset 1114.

In an operation 1302, a request is sent to each second worker device 1100 of second worker system 806 to compute a classification probability for each observation vector stored in input data subset 1114 distributed to each second worker device 1100. The request is sent by a controller thread of second controller device 804. Processing by each second worker device 1100 is described in FIG. 14B. The request may include the values for the parameters indicated in operations 1200 to 1204 and those read from classification model description 224 or the values may be provided in a storage location known to each worker device 400 or otherwise provided to each worker device 400.

In an operation 1304, an indicator is received from each second worker device 1100 of second worker system 806 indicating that the classification probability has been computed for each observation vector stored in input data subset 1114.

In an operation 1306, a done indicator is sent to second user device 900 indicating that the classification process is complete.

Figure 14:
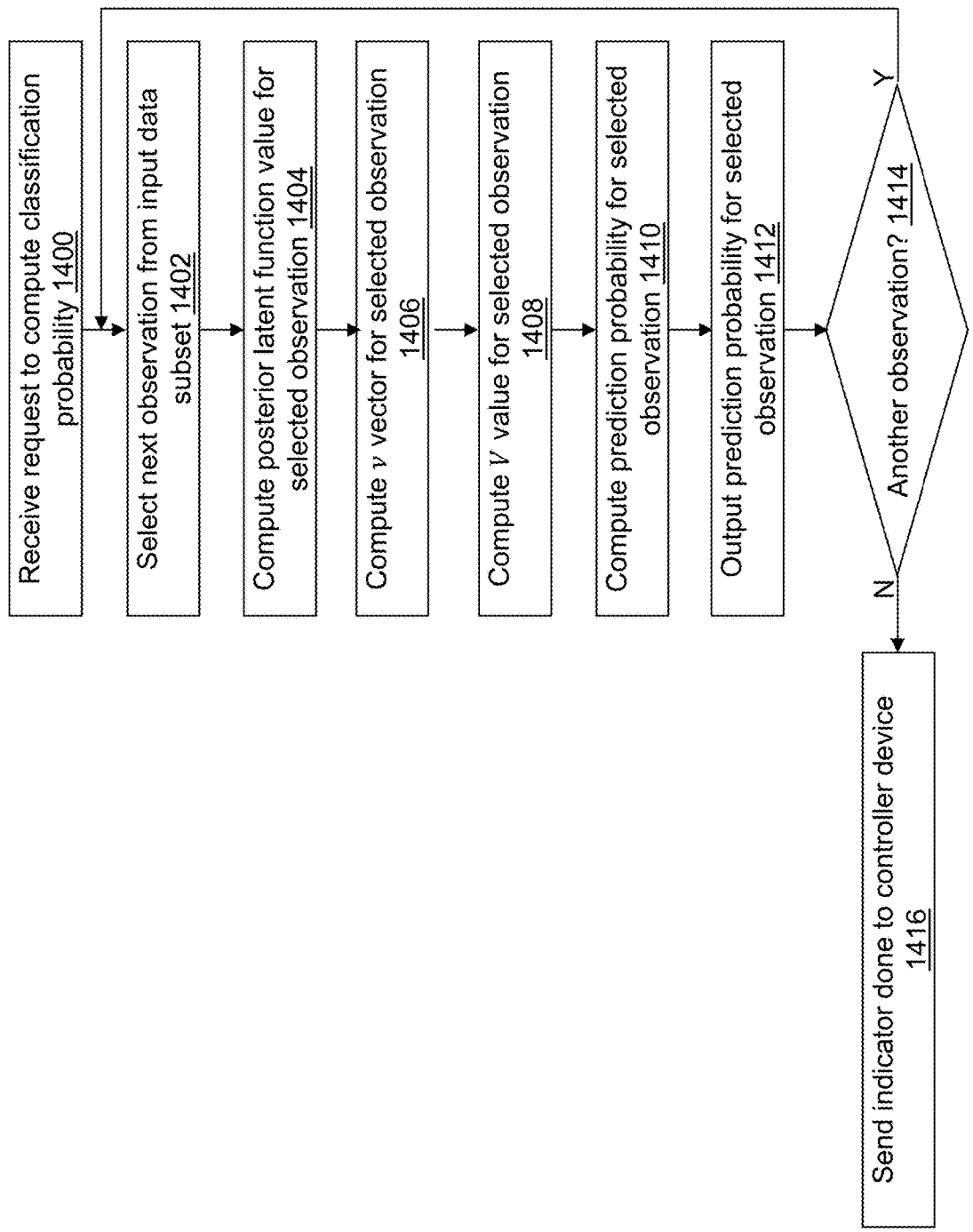
FIG. 14 depicts a flow diagram illustrating examples of operations performed by the worker device of FIG. 11 in accordance with an illustrative embodiment.

Referring to FIG. 14, example operations associated with second worker application 1112 are described. Additional, fewer, or different operations may be performed depending on the embodiment. The order of presentation of the operations of FIG. 14 is not intended to be limiting. When second controller device 804 is acting as a worker device second controller device 804 also executes the operations of FIG. 14 with an assigned input data subset 1114.

Referring to FIG. 14, in an operation 1400, the request to compute the classification probability is received from second controller device 804 as a result of operation 1302.

In an operation 1402, a next observation $x_i$ is selected from input data subset 1114 allocated to the respective second worker device 1100. For example, on a first iteration of operation 1402, a first observation is read from input data subset 1114; on a second of operation 1402, a second observation is read from input data subset 1114; and so on.

In an operation 1404, a posterior latent function value $f$ is computed for the selected next observation using, for example, $f = k^T(x_i)D_g$, where $k(x_i)$ is a vector having length $N_T$ that is a projection of the selected next observation using a kernel bivariate function selected based on the kernel function $K_f$ such as Gaussian, linear, exponential, etc. as $k(x_i) = [K_f(x_i, x_1), K_f(x_1, x_2), \ldots, K_f(x_i, x_{N_T})]$, where $x_1, x_2, \ldots, x_{N_T}$ are observation vectors read from the training dataset, $N_T$ is a number of observation vectors included in the training dataset read from classification model description 224, and $D_g$ is the global D vector read from classification model description 224.

In an operation 1406, a v vector is computed for the selected next observation using, for example, $v = L_g \backslash (W_g^{0.5} k(x_i))$ where $L_g$ is the global Cholesky decomposition read from classification model description 224, and $W_g$ is the global W vector read from classification model description 224.

In an operation 1408, a V value is computed for the selected next observation using, for example, $V = K_f(x_i, x_i) - v^T v$, where the V value defines a deviation value.

In an operation 1410, a prediction probability value $\pi$ is computed for the selected next observation using, for example, $\pi = \int \sigma(z) N(z|f, V)$ and a Laplacian approximation. The prediction probability value $\pi$ indicates a probability that the selected next observation belongs to a first of two possible classes. To classify the selected next observation, a threshold such as 0.5 can be applied to select between the two possible classes. For illustration, the computation of prediction probability value $\pi$ is described in a paper by Williams, Christopher K. I. and David Barber, *Bayesian Classification With Gaussian Processes*, IEEE Trans. Pattern Anal. Mach. Intell. 20 1342-1351 (1998). To compute the Gaussian integral over the logistic sigmoid function, an approximation based on an expansion of a sigmoid function in terms of an error function can be used. For illustration, a basis set of five scaled error functions can be used to interpolate the logistic sigmoid at the selected next observation $x_i$. For example, $\lambda[0] = 0.41$ $\lambda[1] = 0.4$ $\lambda[2] = 0.37$ $\lambda[3] = 0.44$ $\lambda[4] = 0.39$ $t[0] = 0.0$ $t[1] = 0.6$ $t[2] = 2.0$ $t[3] = 2.5$ $t[4] = 4.5$ $t[5] = \infty$ for i=0, 1, 2, 3, 4, 5
for j=0, 1, 2, 3, 4

$$A[i, j] = \frac{erf(t[i] \times \lambda[j]) + 1}{2}$$

end for $$b[i] = \frac{1}{1 + e^{-t[i]}}$$

end for $\xi = A^{-1} b$ for j=0, 1, 2, 3, 4

$$a[j] = \lambda[i] \frac{f}{\sqrt{1 + 2V\lambda^2[j]}}$$

$r[j] = erf(a[j])/2$ end for $\pi^* = <r, \xi> + 0.5$ where $<r, \xi>$ indicates an inner product of r and $\xi$. $\lambda$, $\xi$, a, r are vectors with a length of five, b and t are vectors of length six, and A is a matrix of size six by five. $\pi^*$ is a probability that $x_i$ is placed into a Class 1. $\xi$ may be computed only on a first iteration.

In an operation 1412, the prediction probability value π and/or the selected classification are output to classification output data subset 1116. The selected next observation may further be output to classification output data subset 1116 in association with the prediction probability value π and/or the selected classification.

In an operation 1414, a determination is made concerning whether input data subset 1114 includes another observation. If input data subset 1114 includes another observation, processing continues in operation 1402 to select and process the next observation. If input data subset 1114 does not include another observation, processing continues in an operation 1416.

In operation 1416, an indicator that the observations in input data subset 1114 have been classified is sent from second worker device 1100 of second worker system 806 to second controller device 804, and processing continues in operation 1306 of FIG. 13.

Experimental results were generated using the operations of classification model training application 222 and classification application 922 with three different datasets. A test dataset and a training dataset were defined for each dataset. Classification performance was computed using the test dataset and classification application 922 after training using the training dataset and classification model training application 222. A first dataset included two linearly separable Gaussian distributions with each including 50 observations. A second dataset included two crescent shaped distributions with each including 300 observations. A third dataset included two concentric circle shaped distributions, with each including 300 observations.

Figure 15A:
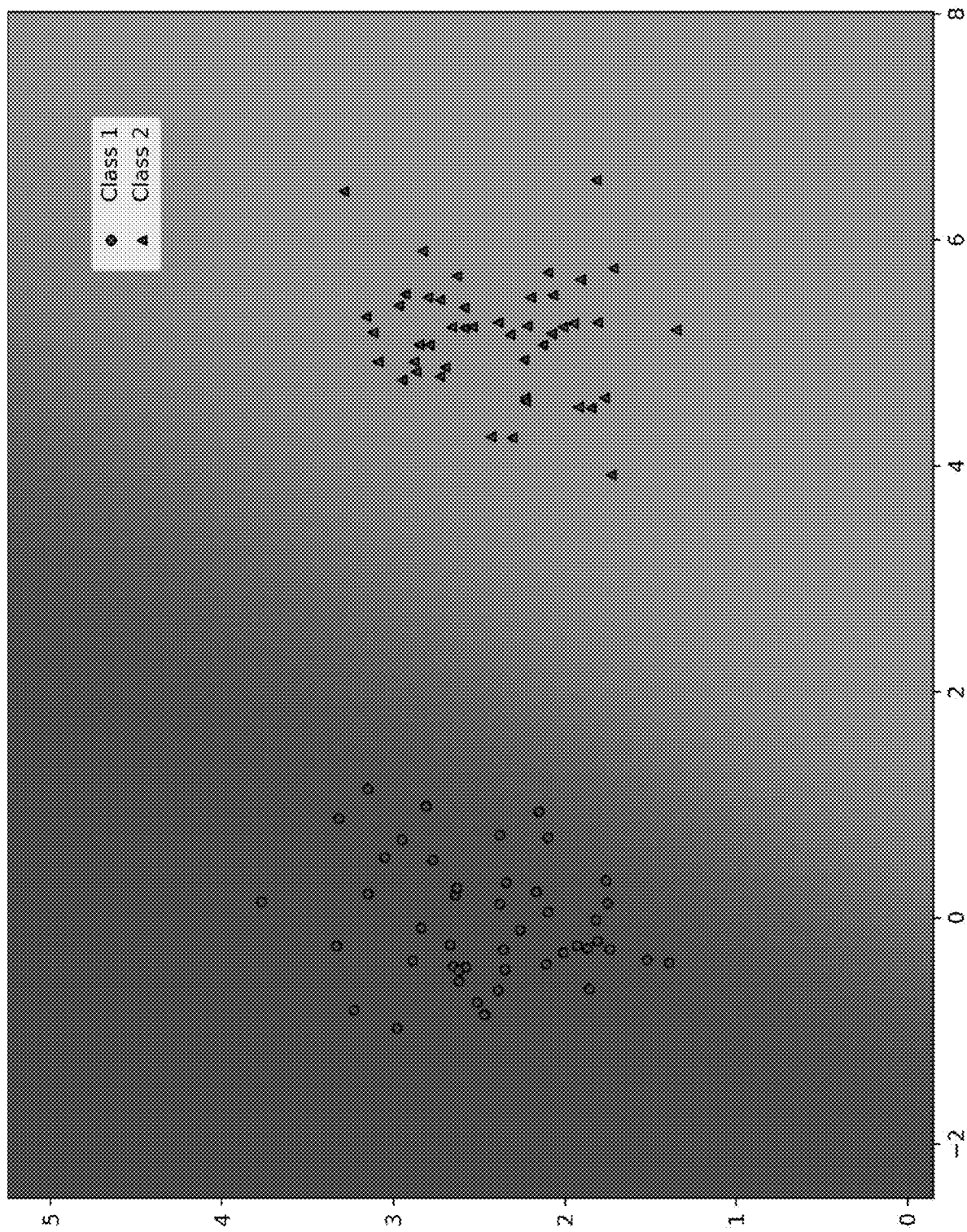
FIG. 15A shows a classification and a probability grid for a first dataset computed by the classification system of FIG. 8 in accordance with an illustrative embodiment.

Referring to FIG. 15A, a classification and a probability grid for the first dataset are shown in accordance with an illustrative embodiment. The two classes are colored as red and green, with the gradual changing of colors reflecting the predicted probability value for each observation over the two classes. For example, a predicted probability value less than 0.5 is a shade of red based on how much less than 0.5 the predicted probability value is, and a predicted probability value greater than 0.5 is a shade of green based on how much greater than 0.5 the predicted probability value is. Classification model training application 222 and classification application 922 resulted in 100% accuracy.

Figure 15B:
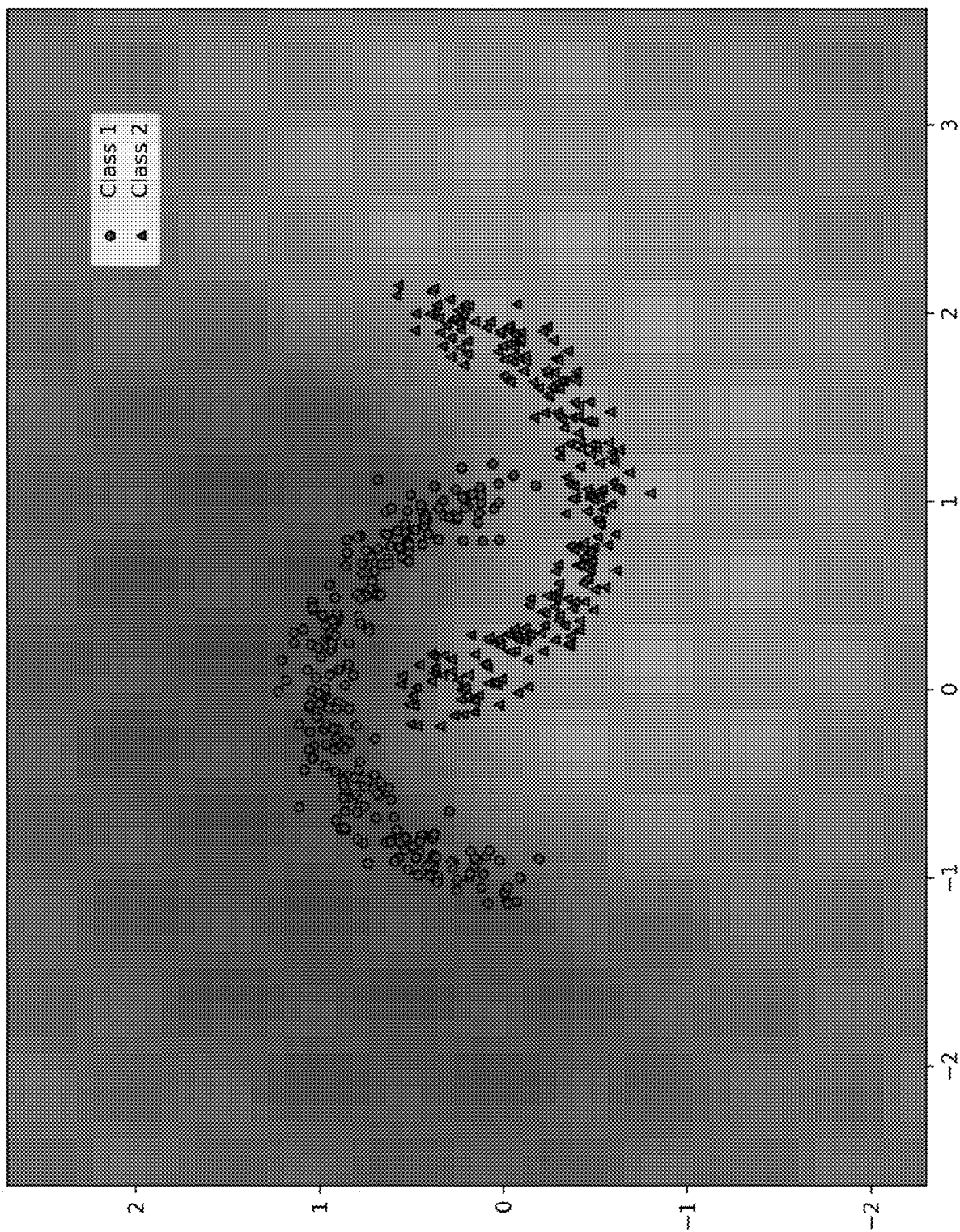
FIG. 15B shows a classification and a probability grid for a second dataset computed by the classification system of FIG. 8 in accordance with an illustrative embodiment.

Referring to FIG. 15B, a classification and a probability grid for the second dataset are shown in accordance with an illustrative embodiment. The two classes are colored as red and green, with the gradual changing of colors reflecting the predicted probabilities over the two classes. Classification model training application 222 and classification application 922 resulted in 98.5% accuracy.

Figure 15C:
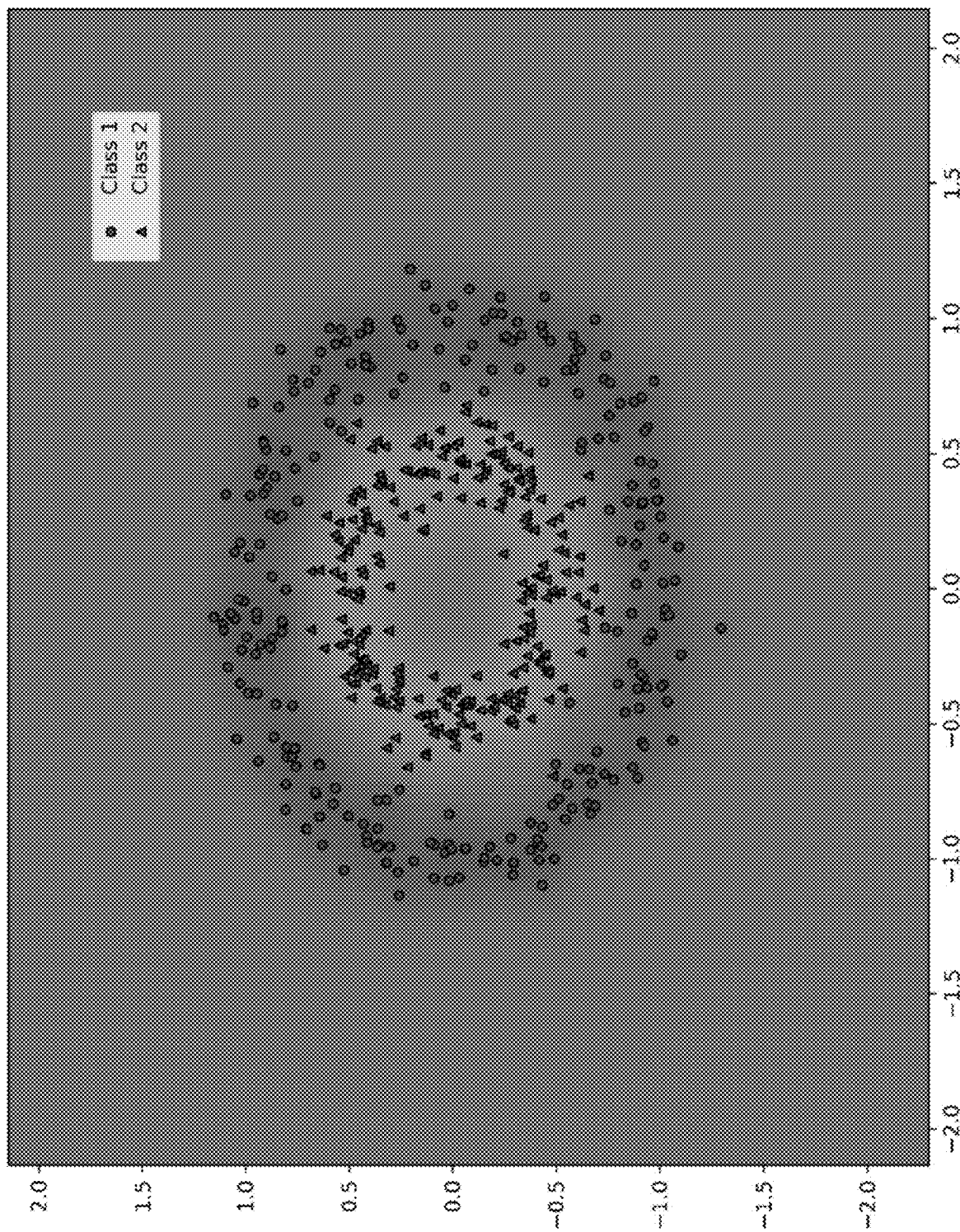
FIG. 15C shows a classification and a probability grid for a third dataset computed by the classification system of FIG. 8 in accordance with an illustrative embodiment.

Referring to FIG. 15C, a classification and a probability grid for the third dataset are shown in accordance with an illustrative embodiment. The two classes are colored as red and green, with the gradual changing of colors reflecting the predicted probabilities over the two classes. Classification model training application 222 and classification application 922 resulted in 99.5% accuracy.

Figure 16A:
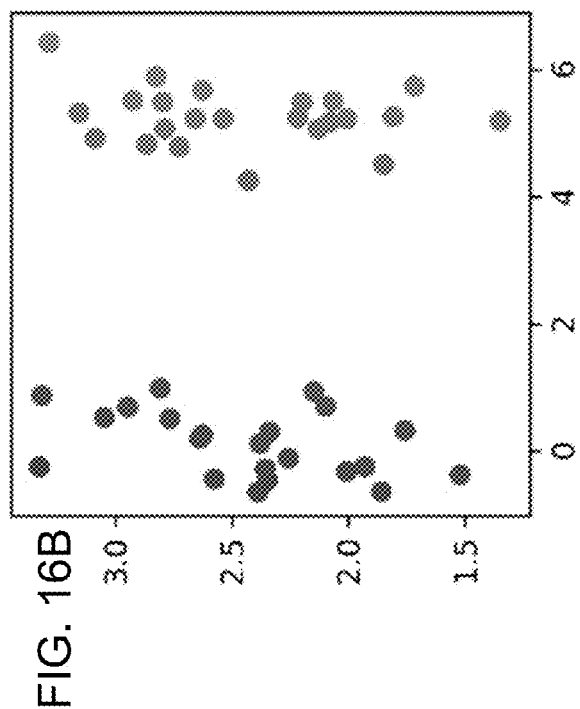
FIGS. 16A to 16D show a classification computed for the first dataset using four different classification systems in accordance with an illustrative embodiment.

Referring to FIGS. 16A to 16D, a classification computed for the first dataset using four different classification systems is shown in accordance with an illustrative embodiment. Referring to FIG. 16A, a classification for the first dataset is shown using classification model training application 222 and classification application 922. The accuracy was 100%.

Figure 16B:
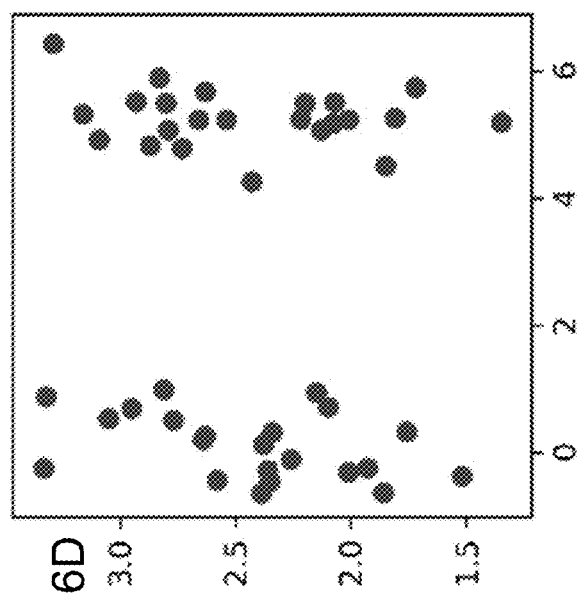

Referring to FIG. 16B, a classification for the first dataset is shown using a support vector machine classification algorithm. The accuracy was 100%.

Figure 16C:
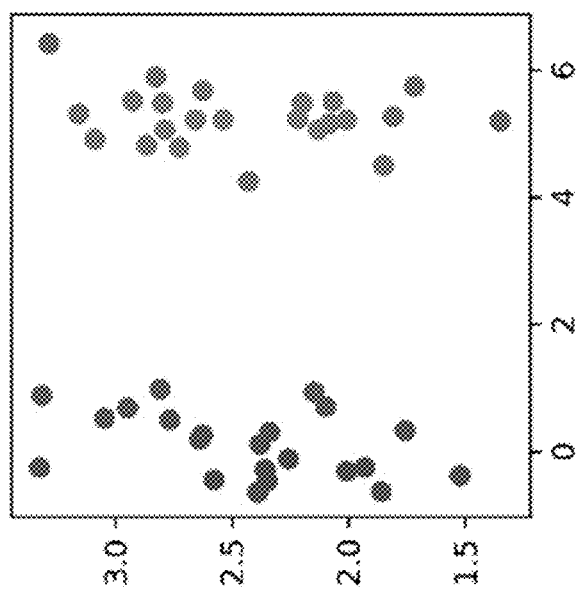

Referring to FIG. 16C, a classification for the first dataset is shown using a neural network classification algorithm. The accuracy was 100%.

Figure 16D:
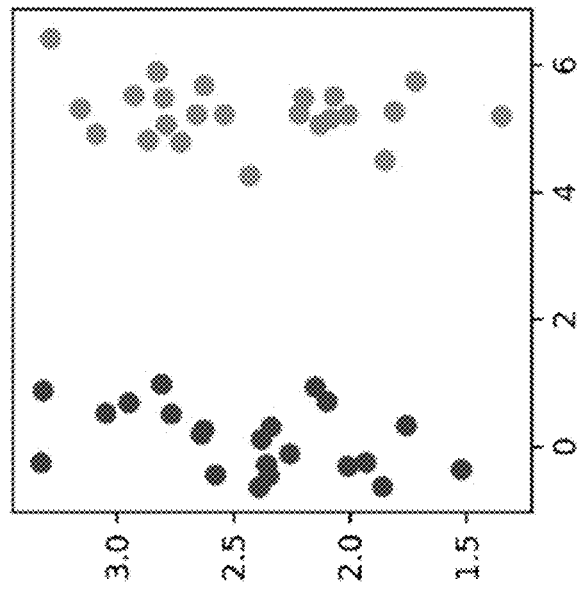

Referring to FIG. 16D, a classification for the first dataset is shown using a k-nearest neighbors classification algorithm. The accuracy was 100%.

Figure 17A:
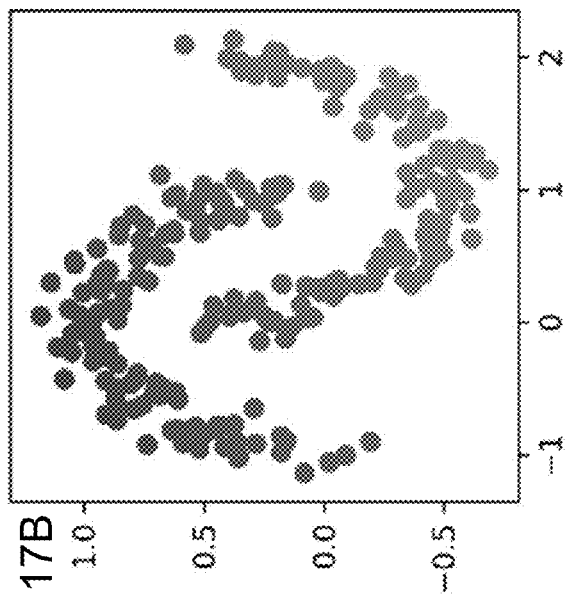
FIGS. 17A to 17D show a classification computed for the second dataset using four different classification systems in accordance with an illustrative embodiment.

Referring to FIGS. 17A to 17D, a classification computed for the second dataset using the four different classification systems is shown in accordance with an illustrative embodiment. Referring to FIG. 17A, a classification for the second dataset is shown using classification model training application 222 and classification application 922. The accuracy was 100%.

Figure 17B:
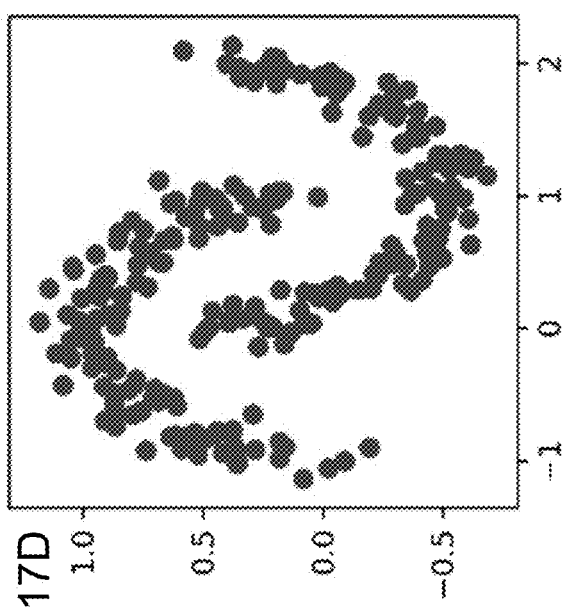

Referring to FIG. 17B, a classification for the second dataset is shown using the support vector machine (SVM) classification algorithm. The accuracy was 87.6%.

Figure 17C:
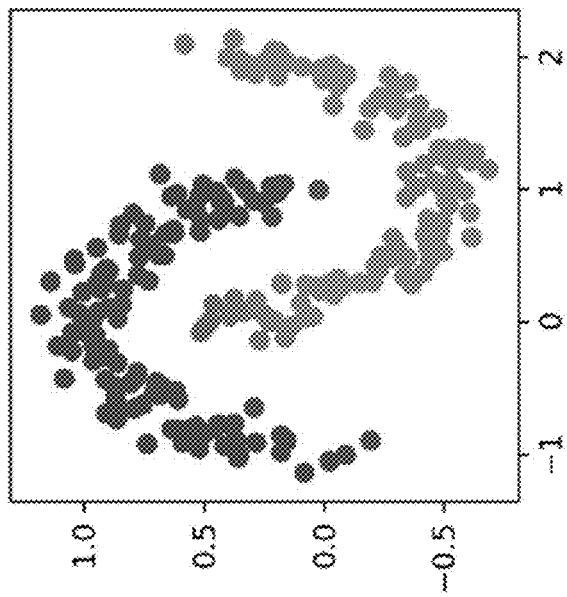

Referring to FIG. 17C, a classification for the second dataset is shown using the neural network (neural net) classification algorithm. The accuracy was 100%.

Figure 17D:
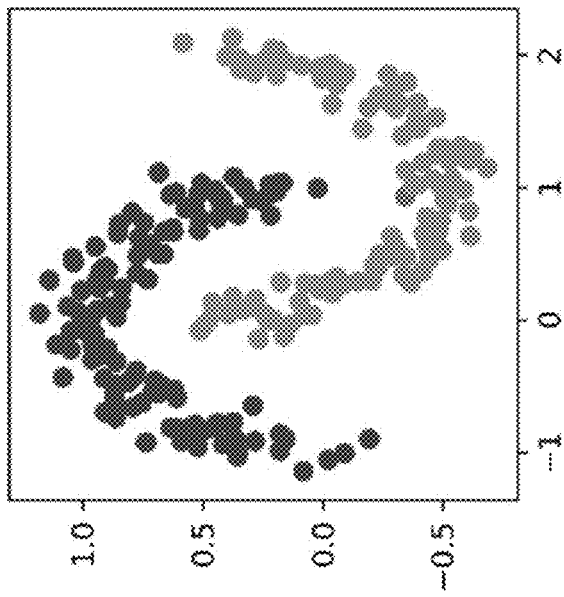

Referring to FIG. 17D, a classification for the second dataset is shown using the k-nearest neighbors (KNN) classification algorithm. The accuracy was 100%.

Figure 18B:
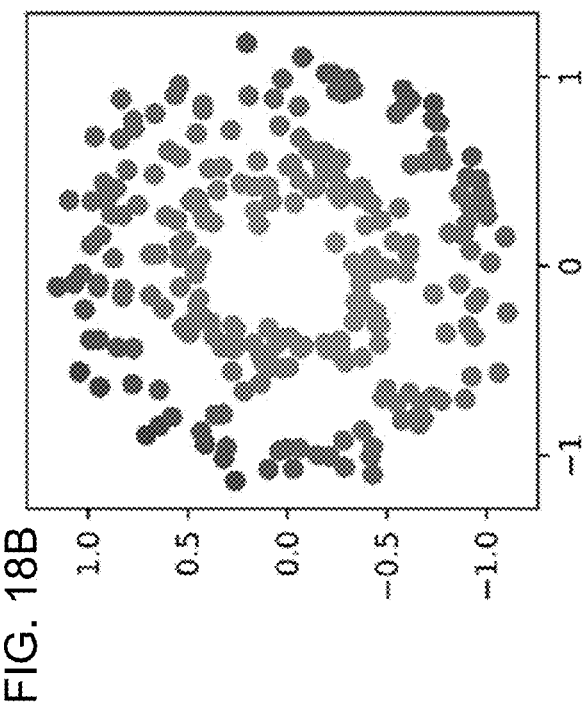
FIGS. 18A to 18D show a classification computed for the third dataset using four different classification systems in accordance with an illustrative embodiment.
Figure 18D:
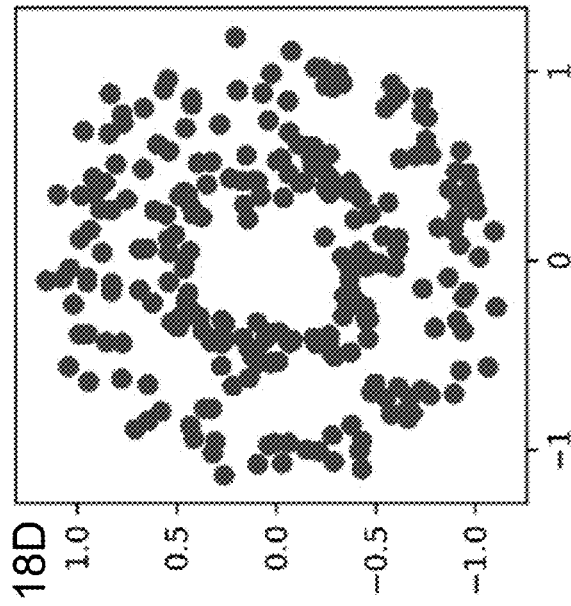
Figure 18A:
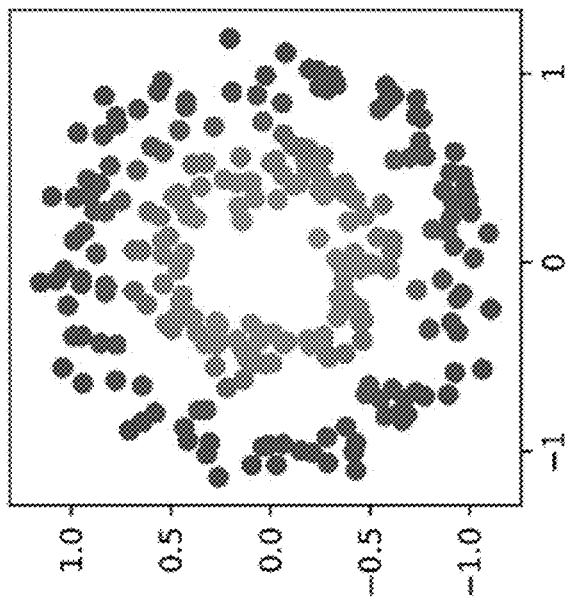

Referring to FIGS. 18A to 18D, a classification computed for the third dataset using the four different classification systems is shown in accordance with an illustrative embodiment. Referring to FIG. 18A, a classification for the third dataset is shown using classification model training application 222 and classification application 922. The accuracy was 99.2%.

Referring to FIG. 18B, a classification for the third dataset is shown using the support vector machine classification algorithm. The accuracy was 71.2%.

Figure 18C:
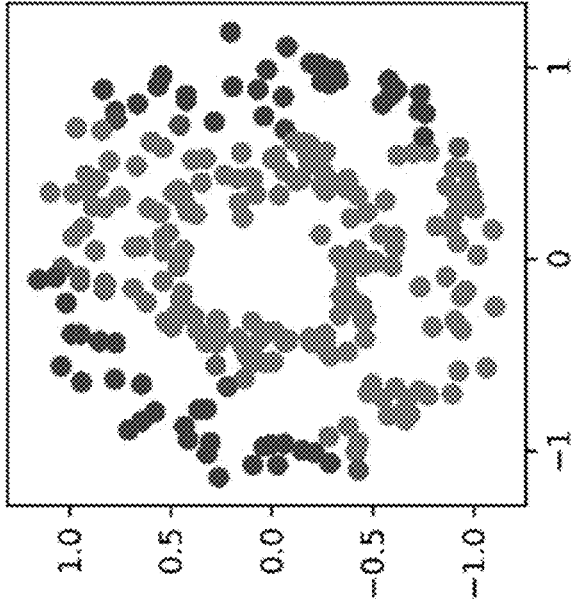

Referring to FIG. 18C, a classification for the third dataset is shown using the neural network classification algorithm. The accuracy was 73.6%.

Referring to FIG. 18D, a classification for the third dataset is shown using the k-nearest neighbors classification algorithm. The accuracy was 98%.

Table I below summarizes the classification accuracy performance.

TABLE I

| Dataset | 222/922 | SVM | Neural Net | KNN |
| --- | --- | --- | --- | --- |
| First | 100 | 100 | 100 | 100 |
| Second | 100 | 87.6 | 100 | 100 |
| Third | 99.2 | 71.2 | 73.6 | 98 |

Using classification model training application 222 and classification application 922 provides significantly more accurate. The prediction probability computed by classification model training application 222 and classification application 922 further indicates a level of confidence associated with each classification.

Figure 19:
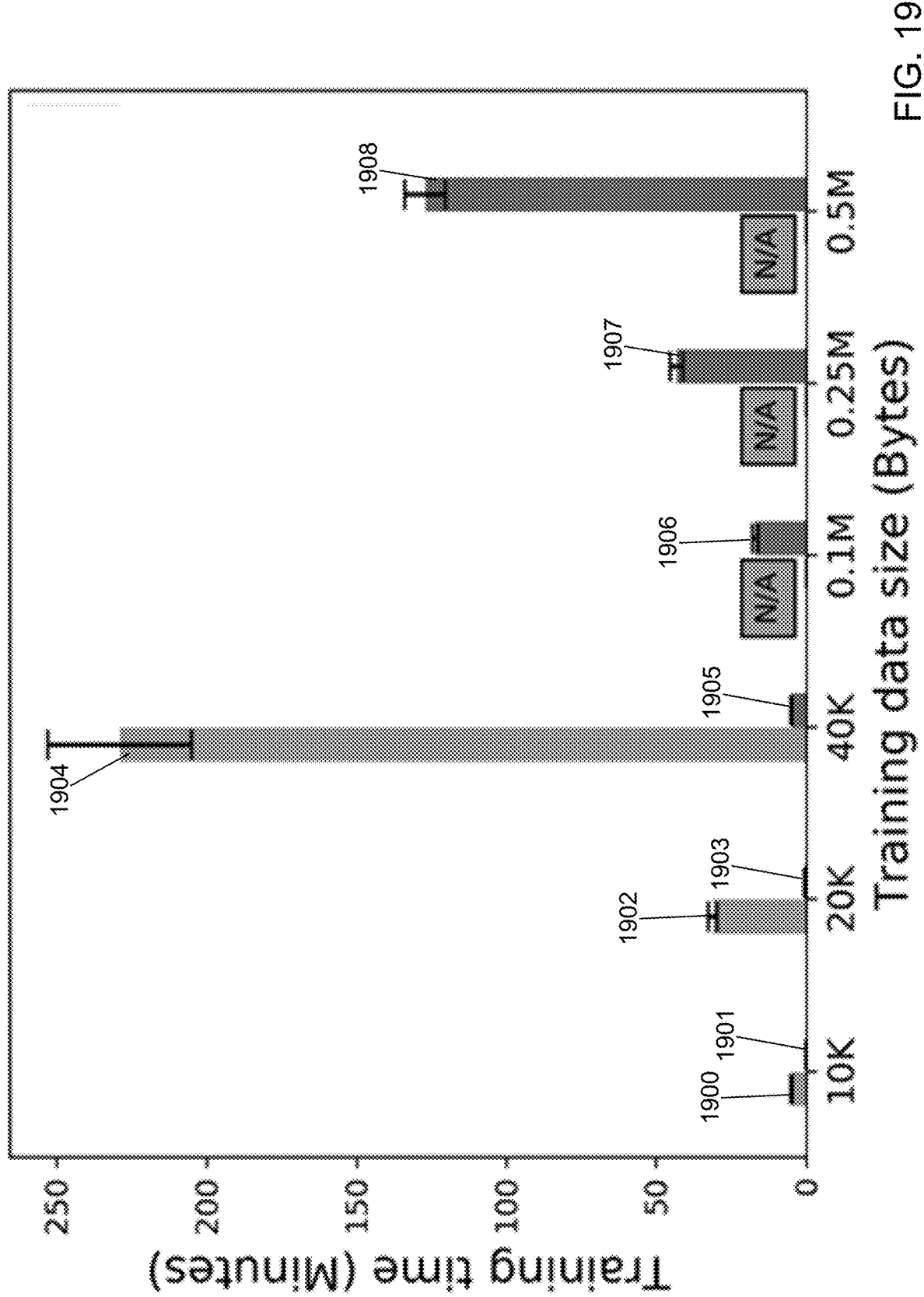
FIG. 19 shows a computing time comparison between two different classification model training systems using a dataset with successively increasing numbers of observation vectors included in a training dataset in accordance with an illustrative embodiment.

Experimental results were generated using the operations of classification model training application 222. Referring to FIG. 19, a classification run time comparison was performed between classification model training application 222 and the classification model training application described in U.S. Pat. No. 10,877,277 (the '277 patent method), assigned to the assignee of the present application. A dataset with successively increasing numbers of observation vectors was used. The experiment was conducted using a computing grid with a central controller and 100 workers. The controller had 72 CPUs with a base frequency of 2.3 gigahertz (GHz), and each worker had 32 CPUs of 2.7 GHz. Each application was executed 10 times.

A first bar 1900 represents a computation time using the '277 patent method with 10,000 observations. A second bar 1901 represents a computation time using classification model training application 222 with 10,000 observations. A third bar 1902 represents a computation time using the '277 patent method with 20,000 observations. A fourth bar 1903 represents a computation time using classification model training application 222 with 20,000 observations. A fifth bar 1904 represents a computation time using the '277 patent method with 40,000 observations. A sixth bar 1905 represents a computation time using classification model training application 222 with 40,000 observations. A seventh bar 1906 represents a computation time using classification model training application 222 with 100,000 observations. The '277 patent method ran out of memory and was unable to perform the classification model training with 100,000 observations. An eighth bar 1907 represents a computation time using classification model training application 222 with 250,000 observations. The '277 patent method ran out of memory and was unable to perform the classification model training with 250,000 observations. A ninth bar 1908 represents a computation time using classification model training application 222 with 500,000 observations. The '277 patent method ran out of memory and was unable to perform the classification model training with 500,000 observations.

According to complexity analysis, based on the same hardware capacity, classification model training application 222 can process a $N_w$ times larger training data size with a speed gain of $N_w^2$ times relative to the '277 patent method. There is further no loss in accuracy when using classification model training application 222 relative to the '277 patent method. Classification model training application 222 does not require a complicated allocation scheme for the data distribution or a more complicated grid communication mechanism than the simple message passing interface. Thus, classification model training application 222 is easy to implement using a cloud infrastructure such as on the Cloud Analytic System (CAS) infrastructure.

There are applications for classification model training application 222 and classification application 922 in many areas such as process control and equipment health monitoring, image processing and classification, data segmentation, data analysis, etc. Classification model training application 222 and classification application 922 provide efficient distributed and parallel computing device implementations for training and using classification models based on GPC processing with LA inference. The presented results demonstrate improved or identical accuracy with significantly faster computing times and application to big data that cannot be stored on a single computing device.

The explosion of digital data is generating many opportunities for big data analytics, which in turn provides many opportunities for training classification models to capitalize on the information contained in the data—to make better predictions that lead to better decisions.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise. The illustrative embodiments may be implemented as a method, apparatus, or article of manufacture using standard programming and/or engineering techniques to produce software, firmware, hardware, or any combination thereof to control a computer to implement the disclosed embodiments.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by each computing device of a plurality of worker computing devices cause each computing device to:

receive a unique worker index from a controller device, wherein the unique worker index is sequentially assigned to each worker computing device of the plurality of worker computing devices by the controller device, wherein a higher index worker has a higher value for the sequentially assigned, unique worker index, wherein a lower index worker has a lower value for the sequentially assigned, unique worker index;

in response to receipt of a first computation request from the controller device, access a training data subset distributed to a respective computing device, wherein the training data subset is a subset of a training dataset;

send the accessed training data subset to each higher index worker computing device;

receive the training data subset sent by each lower index worker computing device;

compute a first kernel matrix block for the accessed training data subset using a predefined kernel function, wherein the first kernel matrix block is computed between observation vectors included in the accessed training data subset; and compute a second kernel matrix block for each received training data subset using the predefined kernel function, wherein each second kernel matrix block is computed between observation vectors included in the accessed training data subset and each respective, received training data subset;

(A) in response to receipt of a second computation request from the controller device, compute a first vector using the computed first kernel matrix block and each computed second kernel matrix block;

compute a latent function vector using the computed first kernel matrix block and the computed first vector;

compute an objective function value using the computed first vector, the computed latent function vector, and a likelihood function value computed for each observation vector included in the accessed training data subset; and send the computed objective function value to the controller device;

wherein (A) is repeated until the controller device determines training of a classification model is complete; and output model parameters for the trained classification model, wherein the model parameters are computed from the likelihood function value computed for each observation vector included in the accessed training data subset, the computed first kernel matrix block, and each computed second kernel matrix block.

2. The non-transitory computer-readable medium of claim 1, wherein the likelihood function value is computed using a predefined likelihood function.

3. The non-transitory computer-readable medium of claim 2, wherein the predefined likelihood function is a sigmoid function.

4. The non-transitory computer-readable medium of claim 2, wherein the predefined likelihood function is $1/1+e^{-y_i f(x_i)}$, where $x_i$ is an $i^{th}$ observation vector included in the accessed training data subset, $y_i$ is a target variable value of the $i^{th}$ observation vector, and $f(x_i)$ is a value included in the computed latent function vector for the $i^{th}$ observation vector.

5. The non-transitory computer-readable medium of claim 1, wherein the predefined kernel function is a Gaussian kernel function, and the first kernel matrix block is computed using $$K(x_i, x_j) = \exp\frac{-\|x_i - x_j\|^2}{2s^2} i = 1, \ldots,$$

N, j=1, . . . N, where $x_i$ is an $i^{th}$ observation vector of the accessed training data subset, $x_j$ is a $j^{th}$ observation vector of the accessed training data subset, N is a number of observation vectors included in the accessed training data subset, and s is a Gaussian bandwidth parameter value.

6. The non-transitory computer-readable medium of claim 1, wherein the predefined kernel function is a Gaussian kernel function, and each second kernel matrix block is computed using $$K(x_i, x_j) = \exp\frac{-\|x_i - x_j\|^2}{2s^2} i = 1, \ldots,$$

j=1, . . . N, where $x_i$ is an $i^{th}$ observation vector of the accessed training data subset, $x_j$ is a $j^{th}$ observation vector of a respective, received training data subset, N is a number of observation vectors included in the accessed training data subset, and s is a Gaussian bandwidth parameter value.

7. The non-transitory computer-readable medium of claim 1, wherein the latent function vector is computed using $f=Ka$, where $f$ is the latent function vector having a latent function value for each observation vector included in the accessed training data subset, K is the computed first kernel matrix block, and a is the computed first vector having a value for each observation vector included in the accessed training data subset.

8. The non-transitory computer-readable medium of claim 1, wherein the objective function value is computed using $C=-0.5a^T f + \Sigma_{i=1}^{N} \log l(y_i|f(x_i))$, where C is the objective function value, a is the computed first vector having a value for each observation vector included in the accessed training data subset, $x_i$ is an $i^{th}$ observation vector included in the accessed training data subset, $y_i$ is a target variable value of the $i^{th}$ observation vector, $f(x_i)$ is a value included in the computed latent function vector for the $i^{th}$ observation vector, $l(y_i|f(x_i))$ is a likelihood function value computed using a predefined likelihood function l( ), and N is a number of observation vectors included in the accessed training data subset.

9. The non-transitory computer-readable medium of claim 8, wherein the controller device sums the objective function value computed by each computing device of the plurality of worker computing devices to determine that training of the classification model is complete.

10. The non-transitory computer-readable medium of claim 9, wherein an objective function change value $\Delta C$ is computed using $\Delta C=|C_g - C_{g,p}|$, where $C_{g,p}$ is the summed objective function value computed from a prior iteration of (A), and $C_g$ is the summed objective function value computed from a current iteration of (A).

11. The non-transitory computer-readable medium of claim 10, wherein training of the classification model is complete when $\Delta C < Th$, where Th is a predefined convergence threshold.

12. The non-transitory computer-readable medium of claim 1, wherein the first vector is computed using $a=b_1 - W_1^{0.5} P$, where a is the computed first vector having a first value for each observation vector included in the accessed training data subset, $b_1$ is a first portion of a second vector having a second value for each observation vector included in the accessed training data subset, $W_1$ is a first portion of a third vector having a third value for each observation vector included in the accessed training data subset that is computed using a second order derivative of a logarithm of a predefined likelihood function, and P is an intermediate vector having an intermediate vector value for each observation vector included in the accessed training data subset that is computed using a portion of a Cholesky decomposition matrix.

13. The non-transitory computer-readable medium of claim 12, further comprising computer-readable instructions that cause each computing device to compute the third vector, wherein computing the third vector comprises:
    computing the first portion of the third vector for the accessed training data subset using $W_1 = -\nabla\nabla \log l(y_i|f(x_i))$, i=1, . . . , N, where $\nabla\nabla$ indicates the second order derivative of the logarithm of the predefined likelihood function, $x_i$ is an $i^{th}$ observation vector included in the accessed training data subset, $y_i$ is a target variable value of the $i^{th}$ observation vector, $f(x_i)$ is a value included in the computed latent function vector for the $i^{th}$ observation vector, $l(y_i|f(x_i))$ is a likelihood function value computed using the predefined likelihood function l( ), and N is a number of observation vectors included in the accessed training data subset;
    sending the computed first portion of the third vector to each higher index worker computing device; and
    receiving a second portion of the third vector from each lower index worker computing device,
    wherein the third vector is a concatenation of each received second portion of the third vector with the computed first portion of the third vector, wherein each received second portion of the third vector is added to the third vector in numerical order based on the unique worker index assigned to a respective sending worker computing device, wherein the computed first portion of the third vector is added to the third vector last.

14. The non-transitory computer-readable medium of claim 13, wherein the second vector is computed using $b_1=W_1 f + D$, where $f$ is the latent function vector having a latent function value for each observation vector included in the accessed training data subset, $D=\nabla \log l(y_i|f(x_i))$, i=1, . . . , N, $\nabla$ indicates a first order derivative of the logarithm of the predefined likelihood function, and D is a fourth vector having a fourth value for each observation vector included in the accessed training data subset.

15. The non-transitory computer-readable medium of claim 13, wherein the intermediate vector is computed using $P=L_{h.}^{T}\backslash Q$, where $L_{h.}$ indicates the portion of the Cholesky decomposition matrix, Q is a second intermediate vector having a number of values equal to a number of rows of the portion of the Cholesky decomposition matrix, T indicates a matrix transpose, and \ indicates division.

16. The non-transitory computer-readable medium of claim 15, wherein the number of values is N×h, where h is the unique worker index assigned to a respective computing device, wherein $L_{h.}$ has matrix dimension N×(N×h).

17. The non-transitory computer-readable medium of claim 15, further comprising computer-readable instructions that cause each computing device to compute the second intermediate vector, wherein computing the second intermediate vector comprises:
computing a first portion of the second vector for the accessed training data subset using $b_1=W_1 f+D$, where $f$ is the latent function vector having a latent function value for each observation vector included in the accessed training data subset, $D=\nabla \log l(y_i|f(x_i))$, i=1, . . . , N, $\nabla$ indicates a first order derivative of the logarithm of the predefined likelihood function, and D is a fourth vector having a fourth value for each observation vector included in the accessed training data subset;
sending the computed first portion of the second vector to each higher index worker computing device; and
receiving a second portion of the second vector sent by each lower index worker computing device,
wherein the second vector is a concatenation of each received second portion of the second vector with the computed first portion of the second vector, wherein each received second portion of the second vector is added to the second vector in numerical order based on the unique worker index assigned to the respective sending worker computing device, wherein the computed first portion of the second vector is added to the second vector last,
wherein $Q=L_{h.}\backslash(W^{0.5}K_{h.}b)$, where W is the third vector, b is the second vector, and $K_{h.}$ is each second kernel matrix block successively stacked in numerical order based on the unique worker index assigned to the respective sending worker computing device, wherein the first kernel matrix block is added to $K_{h.}$ last.

18. The non-transitory computer-readable medium of claim 17, further comprising computer-readable instructions that cause each computing device to compute the portion of the Cholesky decomposition matrix, wherein computing the portion of the Cholesky decomposition matrix comprises:
computing a first matrix block using $A_{hh}=I-W_1^{0.5}K_1W_1^{0.5}$ where h is the unique worker index assigned to a respective computing device, I is an N×N identity matrix, and $K_1$ is the computed first kernel matrix block; and
computing second matrix blocks using $A_{hs}=W_1^{0.5}K_sW_s^{0.5}$, s=1, . . . , $N_r$, where $N_r$ is a number of received training data subsets, $W_s$ is the second portion of the third vector received from the lower index worker computing device having s as the assigned unique worker index, and $K_s$ is the second kernel matrix block computed from the training data subset received from the lower index worker computing device having s as the assigned unique worker index.

19. The non-transitory computer-readable medium of claim 18, wherein computing the portion of the Cholesky decomposition matrix further comprises:
computing a first Cholesky decomposition block using $L_{11}=cholesky(A_{11})$ by the computing device assigned unique worker index h=1, where cholesky indicates computation of a Cholesky decomposition of $A_{11}$; and
sending the computed first Cholesky decomposition block to each other computing device of the plurality of worker computing devices.

20. The non-transitory computer-readable medium of claim 19, wherein, for each other computing device of the plurality of worker computing devices, computing the portion of the Cholesky decomposition matrix further comprises:
receiving the first Cholesky decomposition block;
computing an h1$^{th}$ Cholesky decomposition matrix using $L_{h1}=L_{11}^{-1}A_{h1}$, where $A_{hi}$ is a second matrix block of the second matrix blocks computed by the computing device assigned unique worker index h and received from the computing device assigned unique worker index h=1; and
sending the computed h1$^{th}$ Cholesky decomposition block to each higher index worker computing device; and
updating an With second matrix block of the second matrix blocks using $A_{hh}=A_{hh}-L_{h1}^{T}L_{h1}$.

21. The non-transitory computer-readable medium of claim 20, wherein, for each other computing device of the plurality of worker computing devices, computing the portion of the Cholesky decomposition matrix further comprises:
receiving the computed h1$^{th}$ Cholesky decomposition block from each lower index worker computing device; and
updating an hl$^{th}$ second matrix block of the second matrix blocks using $A_{hl}=A_{hl}-L_{h1}L_{l1}$, l=2, . . . , $N_{r2}$, where $N_{r2}$ is a number of lower index workers such that l indicates the unique worker index assigned to each lower index worker relative to the computing device other than the computing device assigned unique worker index h=1.

22. The non-transitory computer-readable medium of claim 21, wherein, for each other computing device of the plurality of worker computing devices, computing the portion of the Cholesky decomposition matrix further comprises:
computing an h$^{th}$ Cholesky decomposition block using $L_{hh}=cholesky(A_{hh})$; and
sending the computed h$^{th}$ Cholesky decomposition block to each higher index worker computing device.

23. The non-transitory computer-readable medium of claim 17, wherein the model parameters for the trained classification model include $L_{h.}$, $W_1$, and D computed by each computing device of the plurality of worker computing devices.

24. The non-transitory computer-readable medium of claim 1, further comprising computer-readable instructions that cause each computing device to:
compute a second vector using $W_1=-\nabla\nabla \log l(y_i|f(x_i))$, i=1, . . . , N, where $W_1$ is the second vector, $\nabla\nabla$ indicates a second order derivative of a logarithm of a predefined likelihood function, $x_i$ is an i$^{th}$ observation vector included in the accessed training data subset, $y_i$ is a target variable value of the i$^{th}$ observation vector, $f(x_i)$ is a value included in the computed latent function vector for the $i^{th}$ observation vector, $l(y_i|f(x_i))$ is a likelihood function value computed using the predefined likelihood function $l(\ )$, and N is a number of observation vectors included in the accessed training data subset;

compute a third vector using $D=\nabla \log l(y_i|f(x_i))$, $i=1, \ldots, N$, where D is the third vector, and $\nabla$ indicates a first order derivative of the logarithm of the predefined likelihood function; and compute a portion of a Cholesky decomposition matrix $L_h$, wherein the model parameters for the trained classification model include $L_h$, $W_1$, and D computed by each computing device of the plurality of worker computing devices.

25. The non-transitory computer-readable medium of claim 24, further comprising computer-readable instructions that cause at least one computing device of the plurality of worker computing devices to:

select a new observation vector from a second dataset;

compute a posterior latent function value based on a projection of the selected, new observation vector using the kernel function and the D computed by each computing device of the plurality of worker computing devices;

compute a fourth vector for the selected, new observation vector based on the projection of the selected, new observation vector, the $L_h$ computed by each computing device of the plurality of worker computing devices, and the $W_1$ computed by each computing device of the plurality of worker computing devices; and compute a deviation value for the selected, new observation vector based on the computed fourth vector, wherein a classification probability is computed based on the computed deviation value and the computed posterior latent function value for the selected, new observation vector.

26. The non-transitory computer-readable medium of claim 25, wherein the posterior latent function value is computed using $f=k^T(p)D_g$, where p is the selected, new observation vector, $k(p)$ is the projection of the selected, new observation vector, $D_g$ is a concatenation of the D computed by each computing device of the plurality of worker computing devices, and T indicates a vector transpose.

27. The non-transitory computer-readable medium of claim 26, wherein the projection of the selected, new observation is computed using $k(p)=[K_f(p, x_1), K_f(p, x_2), K_f(p, x_{N_g})]$, where $K_f$ is the predefined kernel function, $x_1, x_2, \ldots, x_{N_g}$ are observation vectors read from the training dataset, and $N_g$ is a number of observation vectors included in the training dataset.

28. The non-transitory computer-readable medium of claim 27, wherein the fourth vector is computed using $v=L_g\backslash(W_g^{0.5}k(x_i))$, where v is the fourth vector, $L_g$ is the $L_h$ computed by each computing device of the plurality of worker computing devices stacked in numerical order based on the sequentially assigned, unique worker index, $W_g$ is a concatenation of the $W_1$ computed by each computing device of the plurality of worker computing devices, and \ indicates division.

29. A system comprising:

a plurality of worker computing devices, wherein each computing device of the plurality of worker computing devices comprises
a processor; and
a non-transitory computer-readable medium having stored thereon computer-readable instructions that when executed by each computing device cause each computing device to receive a unique worker index from a controller device, wherein the unique worker index is sequentially assigned to each worker computing device of the plurality of worker computing devices by the controller device, wherein a higher index worker has a higher value for the sequentially assigned, unique worker index, wherein a lower index worker has a lower value for the sequentially assigned, unique worker index;

in response to receipt of a first computation request from the controller device,
access a training data subset distributed to a respective computing device, wherein the training data subset is a subset of a training dataset;
send the accessed training data subset to each higher index worker computing device;
receive the training data subset sent by each lower index worker computing device;
compute a first kernel matrix block for the accessed training data subset using a predefined kernel function, wherein the first kernel matrix block is computed between observation vectors included in the accessed training data subset; and
compute a second kernel matrix block for each received training data subset using the predefined kernel function, wherein each second kernel matrix block is computed between observation vectors included in the accessed training data subset and each respective, received training data subset;

(A) in response to receipt of a second computation request from the controller device,
compute a first vector using the computed first kernel matrix block and each computed second kernel matrix block;
compute a latent function vector using the computed first kernel matrix block and the computed first vector;
compute an objective function value using the computed first vector, the computed latent function vector, and a likelihood function value computed for each observation vector included in the accessed training data subset; and
send the computed objective function value to the controller device;

wherein (A) is repeated until the controller device determines training of a classification model is complete; and output model parameters for the trained classification model, wherein the model parameters are computed from the likelihood function value computed for each observation vector included in the accessed training data subset, the computed first kernel matrix block, and each computed second kernel matrix block.

30. A method of distributed training of a classification model, the method comprising:

receiving, by each computing device of a plurality of worker computing devices, a unique worker index from a controller device, wherein the unique worker index is sequentially assigned to each worker computing device of the plurality of worker computing devices by the controller device, wherein a higher index worker has a higher value for the sequentially assigned, unique worker index, wherein a lower index worker has a lower value for the sequentially assigned, unique worker index;

in response to receipt of a first computation request from the controller device,
- accessing, by each computing device of the plurality of worker computing devices, a training data subset distributed to a respective computing device, wherein the training data subset is a subset of a training dataset;
- sending, by each computing device of the plurality of worker computing devices, the accessed training data subset to each higher index worker computing device;
- receiving, by each computing device of the plurality of worker computing devices, the training data subset sent by each lower index worker computing device;
- computing, by each computing device of the plurality of worker computing devices, a first kernel matrix block for the accessed training data subset using a predefined kernel function, wherein the first kernel matrix block is computed between observation vectors included in the accessed training data subset; and
- computing, by each computing device of the plurality of worker computing devices, a second kernel matrix block for each received training data subset using the predefined kernel function, wherein each second kernel matrix block is computed between observation vectors included in the accessed training data subset and each respective, received training data subset;

(A) in response to receipt of a second computation request from the controller device,
- computing, by each computing device of the plurality of worker computing devices, a first vector using the computed first kernel matrix block and each computed second kernel matrix block;
- computing, by each computing device of the plurality of worker computing devices, a latent function vector using the computed first kernel matrix block and the computed first vector;
- computing, by each computing device of the plurality of worker computing devices, an objective function value using the computed first vector, the computed latent function vector, and a likelihood function value computed for each observation vector included in the accessed training data subset; and
- sending, by each computing device of the plurality of worker computing devices, the computed objective function value to the controller device;

wherein (A) is repeated until the controller device determines training of a classification model is complete; and outputting, by each computing device of the plurality of worker computing devices, model parameters for the trained classification model, wherein the model parameters are computed from the likelihood function value computed for each observation vector included in the accessed training data subset, the computed first kernel matrix block, and each computed second kernel matrix block.

* * * * *

UNITED STATES PATENT AND TRADEMARK OFFICE
CERTIFICATE OF CORRECTION

PATENT NO. : 11,227,223 B1
APPLICATION NO. : 17/368941
DATED : January 18, 2022
INVENTOR(S) : Yingjian Wang It is certified that error appears in the above-identified patent and that said Letters Patent is hereby corrected as shown below:

In the Specification

Column 5, Line 31:
Delete the phrase "$N_w{}^{th}$" and replace with --$N_w^{th}$--.

Column 5, Line 49:
Delete the phrase "$N_w{}^{th}$" and replace with --$N_w^{th}$--.

Column 13, Lines 32-33:
Delete the phrase "$l(y|f(x)) = \int_{-\infty}^{x} \mathcal{N}(\tau|0,1)d\tau,$" and replace with --$l(y|f(x)) = \int_{-\infty}^{x} \mathcal{N}(\tau|0,1)d\tau,$--.

Column 15, Line 7:
Delete the phrase "$N_w{}^{th}$" and replace with --$N_w^{th}$--.

Column 15, Line 14:
Delete the phrase "$N_w{}^{th}$" and replace with --$N_w^{th}$--.

Column 15, Line 19:
Delete the phrase "$N_w{}^{th}$" and replace with --$N_w^{th}$--.

Column 15, Line 40:
Delete the phrase "$C_g = \Sigma_{h=1}^{N_w} C_h$" and replace with --$C_g = \Sigma_{h=1}^{N_w} C_h$--.

Column 17, Line 17:
Delete the phrase "$K_{11}(x_{i,1}, x_{j,1})$, $i = 1$, $N_{od}$, $j = 1, \ldots, N_{od}$." and replace with Signed and Sealed this
Seventh Day of June, 2022

Katherine Kelly Vidal
*Director of the United States Patent and Trademark Office*

CERTIFICATE OF CORRECTION (continued)
U.S. Pat. No. 11,227,223 B1

--$K_{11}(x_{i,1}, x_{j,1})$, $i = 1, \ldots, N_{od}$, $j = 1, \ldots, N_{od}$.--.

Column 17, Line 52:
Delete the phrase "$K_{33}(x_{i,3}, X_{j,3})$, $i = 1, \ldots, N_{od}$, $j = 1, \ldots, N_{od}$." and replace with
--$K_{33}(x_{i,3}, x_{j,3})$, $i = 1, \ldots, N_{od}$, $j = 1, \ldots, N_{od}$.--.

Column 17, Line 56:
Delete the phrase "$K_{N_w N_w}(x_{i,N_w}, w_{j,N_w})$," and replace with --$K_{N_w N_w}(x_{i,N_w}, x_{j,N_w})$,--.

Column 18, Line 28:
Delete the phrase "$W_s$, $s = 1$, $N_r$," and replace with --$W_s$, $s = 1, \ldots, N_r$--.

Column 18, Line 39:
Delete the phrase "$A_{hh} = I + W_h{}^{0.5} K_{hh} W_h{}^{0.5}$," and replace with --$A_{hh} = I + W_h^{0.5} K_{hh} W_h^{0.5}$,--.

Column 18, Line 40:
Delete the phrase "$A_{hs} = W_h{}^{0.5} K_{hs} W_s{}^{0.5}$," and replace with --$A_{hs} = W_h^{0.5} K_{hs} W_s^{0.5}$,--.

Column 18, Line 42:
Delete the phrase "$A_{11} = I + W_1{}^{0.5} K_{11} W_1{}^{0.5}$;" and replace with --$A_{11} = I + W_1^{0.5} K_{11} W_1^{0.5}$;--.

Column 18, Lines 44-45:
Delete the phrase "$A_{N_w N_w} = I + W_{N_w}{}^{0.5} K_{N_w N_w} W_{N_w}{}^{0.5}$ and $A_{N_w s} = W_{N_w}{}^{0.5} K_{N_w s} W_s{}^{0.5}$," and replace with --$A_{N_w N_w} = I + W_{N_w}^{0.5} K_{N_w N_w} W_{N_w}^{0.5}$ and $A_{N_w s} = W_{N_w}^{0.5} K_{N_w s} W_s^{0.5}$,--.

Column 19, Line 11:
Delete the phrase "$L_{hs} = U_{ss}{}^{-1} A_{hs}$," and replace with --$L_{hs} = L_{ss}^{-1} A_{hs}$,--.

Column 19, Line 23:
Delete the phrase "$A_{hh} = A_{hh} - L^T{}_{hs} L_{hs}$," and replace with --$A_{hh} = A_{hh} - L_{hs}^T L_{hs}$,--.

Column 19, Line 32:
Delete the phrase "$L_{\mu s}$" and replace with --$L_{ls}$--.

Column 19, Line 38:
Delete the phrase "$A_{hl} = A_{hl} - L_{hs}{}^T L_{ls}$." and replace with --$A_{hl} = A_{hl} - L_{hs}^T L_{ls}$.--.

Column 20, Line 1:
Delete the phrase "On the j$^{th}$ worker, $L_{jh} \Leftarrow L_{hh}{}^{-1} A_{jh}$." and replace with --On the j$^{th}$ worker, $L_{jh} \Leftarrow L_{hh}^{-1} A_{jh}$.--.

CERTIFICATE OF CORRECTION (continued)
U.S. Pat. No. 11,227,223 B1

Column 20, Line 6:
Delete the phrase "On the $l^{th}$ worker, $A_{jl} \Leftarrow A_{jl} - L_{jh}{}^T L_{lh}$." and replace with --On the $l^{th}$ worker, $A_{jl} \Leftarrow A_{jl} - L_{jh}^T L_{lh}$.--.

Column 20, Line 35:
Delete the phrase "$Q = L_{h.} \backslash (W_h{}^{0.5} K_{h.} b)$," and replace with --$Q = L_{h.}\backslash(W_h^{0.5} K_{h.} b),$--.

Column 20, Line 47:
Delete the phrase "$P = L_{h.}{}^T \backslash Q$," and replace with --$P = L_{h.}^T \backslash Q,$--.

Column 20, Line 48:
Delete the phrase "$L_{h.}{}^T$" and replace with --$L_{h.}^T$--.

Column 20, Line 52:
Delete the phrase "$a = b_h - W_h{}^{0.5} P$," and replace with --$a = b_h - W_h^{0.5} P,$--.

Column 20, Lines 59-60:
Delete the phrase "$C = -0.5 a^T f + \sum_{i=1}^{Nod} \log l(y_i | f(x_i))$." and replace with --$C = -0.5 a^T f + \sum_{i=1}^{Nod} \log l(y_i | f(x_i))$.--.

Column 20, Line 66:
Delete the phrase "$C = -0.5 a^T f + \sum_{i=1}^{Nod} \log l(y_i | f(x_i))$." and replace with --$C = -0.5 a^T f - \sum_{i=1}^{Nod} \log(1 + e^{-y_i f(x_i)})$--.

Column 22, Line 32:
Delete the phrase "$N_w{}^{th}$" and replace with --$N_w^{th}$--.

Column 26, Line 8:
Delete the phrase "global $W$ vector %," and replace with --global $W$ vector $W_g$,--.

Column 27, Lines 55-56:
Delete the phrase "$v = L_g \backslash (W_g{}^{0.5} k(x_i))$," and replace with --$v = L_g \backslash (W_g^{0.5} k(x_i)),$--.

Column 31, Line 29:
Delete the phrase "$N_w$" and replace with --$\sqrt{N_w}$--.

Column 31, Line 30:
Delete the phrase "$N_w{}^2$" and replace with --$N_w^2$--.

CERTIFICATE OF CORRECTION (continued)

U.S. Pat. No. 11,227,223 B1

In the Claims

Claim 4, Column 33, Line 15:

Delete the phrase "$1/1 + e^{-y_i f(x_i)}$," and replace with --$\frac{1}{1+e^{-y_i f(x_i)}}$--.

Claim 5, Column 33, Lines 27-31:

Delete the phrase "$K(x_i, x_j) = exp \frac{-\|x_i - x_j\|^2}{2s^2} i = 1, ..., N, j = 1, ... N,$," and replace with --$K(x_i, x_j) = exp \frac{-\|x_i - x_j\|^2}{2s^2}, i = 1, ..., N, j = 1, ..., N,$--.

Claim 6, Column 33, Lines 41-45:

Delete the phrase "$K(x_i, x_j) = exp \frac{-\|x_i - x_j\|^2}{2s^2} i = 1, ..., j = 1, ... N,$," and replace with --$K(x_i, x_j) = exp \frac{-\|x_i - x_j\|^2}{2s^2}, i = 1, ..., N, j = 1, ..., N,$--.

Claim 8, Column 33, Line 60:

Delete the phrase "$C = -0.5 a^T f + \sum_{i=1}^{N} \log l(y_i | f(x_i))$," and replace with --$C = -0.5 a^T f + \sum_{i=1}^{N} \log l(y_i | f(x_i))$,--.

Claim 12, Column 34, Lines 20-21:

Delete the phrase "$a = b_1 - W_1^{0.5} P$," and replace with --$a = b_1 - W_1^{0.5} P$,--.

Claim 15, Column 35, Line 6:

Delete the phrase "$P - L_h{.}^T \backslash Q$," and replace with --$P = L_h^T \backslash Q$,--.

Claim 18, Column 35, Lines 56-57:

Delete the phrase "$A_{hh} = I - W_1^{0.5} K_1 W_1^{0.5}$," and replace with --$A_{hh} = I - W_1^{0.5} K_1 W_1^{0.5}$,--.

Claim 20, Column 36, Line 21:

Delete the phrase "$L_{h1} = L_{11}^{-1} A_{h1}$," and replace with --$L_{h1} = L_{11}^{-1} A_{h1}$,--.

Claim 20, Column 36, Line 29:

Delete the phrase "$A_{hh} = A_{hh} - L_{h1}^T L_{h1}$." and replace with --$A_{hh} = A_{hh} - L_{h1}^T L_{h1}$--.

Claim 21, Column 36, Line 39:

Delete the phrase "$A_{hl} = A_{hl} - L_{h1} L_{l1}, l = 2, ..., N_{r2}$," and replace with --$A_{hl} = A_{hl} - L_{h1}^T L_{l1}, l = 2, ..., N_{r2}$,--.

CERTIFICATE OF CORRECTION (continued)
U.S. Pat. No. 11,227,223 B1

<u>Claim 25, Column 37, Lines 23-24:</u>
Delete the phrase "using the kernel function" and replace with --using the predefined kernel function--.

<u>Claim 27, Column 37, Lines 49-50:</u>
Delete the phrase "$k(p) = [K_f(p, x_1), K_f(p, x_2), K_f(p, x_{N_g})]$," and replace with --$k(p) = [K_f(p, x_1), K_f(p, x_2), ..., K_f(p, x_{N_g})]$,--.

<u>Claim 28, Column 37, Line 56:</u>
Delete the phrase "$v = L_g \backslash (W_g^{0.5} k(x_i))$," and replace with --$v = L_g \backslash (W_g^{0.5} k(x_i))$,--.